(12) United States Patent
Kang et al.

(10) Patent No.: US 8,288,497 B2
(45) Date of Patent: Oct. 16, 2012

(54) SYNTHESIS OF POLY-(P-ARYLENEETHYNYLENE)S IN NEAT WATER UNDER AEROBIC CONDITIONS

(75) Inventors: Youn K. Kang, Daegu (KR); Pravas Deria, Philadelphia, PA (US); Michael J. Therien, Durham, NC (US)

(73) Assignee: The Trustees Of The University of Pennsylvania, Philadelphia, PA (US)

( * ) Notice: Subject to any disclaimer, the term of this patent is extended or adjusted under 35 U.S.C. 154(b) by 0 days.

(21) Appl. No.: 13/173,395

(22) Filed: Jun. 30, 2011

(65) Prior Publication Data

US 2011/0257356 A1    Oct. 20, 2011

Related U.S. Application Data

(63) Continuation of application No. 12/394,146, filed on Feb. 27, 2009, now abandoned.

(60) Provisional application No. 61/031,831, filed on Feb. 27, 2008.

(51) Int. Cl.
*C08G 79/08* (2006.01)
*C08G 81/00* (2006.01)
(52) U.S. Cl. ............................................ 528/8; 525/54.2
(58) Field of Classification Search ........ 528/8; 525/54.2
See application file for complete search history.

(56) References Cited

U.S. PATENT DOCUMENTS

2006/0041104 A1* 2/2006 Ait-Haddou et al. ......... 528/397
* cited by examiner

*Primary Examiner* — Robert D. Harlan
(74) *Attorney, Agent, or Firm* — Woodcock Washburn, LLP

(57) ABSTRACT

Provided are ethyne synthons comprising boron and related methods. Also provided are related water-soluble arylethynylene polymers capable of being synthesized in neat water under aerobic conditions.

20 Claims, 16 Drawing Sheets

SYNTHESIS OF POLY-(P-ARYLENEETHYNYLENE)S IN NEAT WATER UNDER AEROBIC CONDITIONS

RELATED APPLICATIONS

This application is a continuation U.S. application Ser. No. 12/394,146, filed Feb. 27, 2009 and claims the benefit of U.S. Application 61/031,831, filed on Feb. 27, 2008, the entirety of each application is incorporated by reference herein.

STATEMENT OF GOVERNMENT INTEREST

The government may have certain rights in this invention. This work was supported by a grant from the Division of Chemical Sciences, Office of Basic Energy Research, U.S. Department of Energy (DE-FGO2-02ER15299). Additional support was provided by MRSEC (DMR-00-79909) and NSEC (DMR-0425780) Programs of the National Science Foundation.

FIELD OF THE INVENTION

The present invention relates to the field of polymer chemistry. The present invention also relates to the field of polymer synthesis.

BACKGROUND OF THE INVENTION

Ethyne-bridged conjugated polymers impact a wide-range of technologies. The efficacy of these species derives not only from their established semiconducting and optical properties but also from the facts that these rigid, rod-like structures are readily processable and manifest high photo and thermal stabilities.

Poly(p-phenyleneethynylene)s (PPEs) define the archetypal examples of ethyne-bridged conjugated polymers. These species have been utilized in organic light-emitting diodes (OLEDs) field-effect transistors (FETs), molecular electronics, nonlinear optical materials, solar energy conversion devices,[13-15] and in a variety of sensory applications. Considerable effort has been directed toward the development of synthetic protocols for repeating arene-ethyne structural motifs.

The palladium-catalyzed Sonogashira reaction and acyclic diyne metathesis (ADIMET) are two approaches to PPEs. While the Sonogashira reaction is compatible with polar functional groups and water, it requires both dihaloarene and diethynylarene synthons, and is accordingly susceptible to the introduction of butadiyne defects in the PPE polymer, which defects are estimated to range from 1 to 10% even under the carefully controlled reaction conditions.

An ADIMET-based synthesis may circumvent butadiyne defect sites, but this method is generally incompatible with sensitive functional groups that include water-soluble side chains; furthermore, the syntheses of carbyne precursors for ADIMET protocols require inert reaction conditions and cannot be implemented in the presence of water.

Despite the fact that water-soluble PPEs have attracted increasing interest in biosensing and bioconjugation applications, relatively few such materials have been reported.

Accordingly, there is a need for an environmentally benign synthetic approach for PPE synthesis, separation, and purification in neat water under an aerobic atmosphere.

SUMMARY OF THE INVENTION

In meeting the challenges set forth, the disclosed invention first provides oligomers or polymers, comprising a plurality of aryleneethynylene units composed of arylene units covalently bonded to ethynylene units, each of the arylene units comprising at least one water solubilizing group. The disclosed invention also provides oligomers or polymers comprising a plurality of [aromatic heterocycle]ethynylene units composed of aromatic heterocycle units covalently bonded to ethynylene units, wherein each the aromatic heterocycle units comprises at least one water solubilizing functional group.

The present invention further discloses oligomers or polymers, comprising a plurality of [conjugated macrocycle]ethynylene units composed of a conjugated macrocycle group covalently bonded to an ethynylene group, and each of the conjugated macrocycle groups comprising at least one water solubilizing functional group.

The present invention also discloses the compounds poly [p-{2,5-bis(3-propoxysulfonicacidsodiumsalt)}phenylene] ethynylene, oligo[p-{2,5-bis(3-propoxysulfonicacidsodiumsalt)}phenylene]ethynylene, poly[2,6-{1,5-bis(3-propoxysulfonicacidsodiumsalt)}napthalene]ethynylene, and oligo[2,6-{1,5-bis(3-propoxysulfonicacidsodiumsalt)}napthalene]ethynylene.

Also provided are compounds having the formula $(OR)_2B-CC-B(OR)_2$, and $(OR)3B^--CC-B^-(OR)_3$, $F_3B^--CC-B^-F_3$, $(OR)_2B-CC-CC-B(OR)_2$, $(OR)_3B-CC-CC-B^-(OR)_3$, $F_3B^--CC-CC-B^-F_3$, and combinations thereof.

Further provided are methods for synthesizing an oligomer or a polymer, comprising contacting a bisborylated alkyne and an arene bis([water-solubilizing group]) salt, the contacting being performed in an aqueous environment.

Also disclosed are methods for synthesizing an alkyne synthon, comprising contacting an ethyne dianion with an alkoxydioxaborolane to give rise to a boro-alkyne; and contacting the boro-alkyne with an acid.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
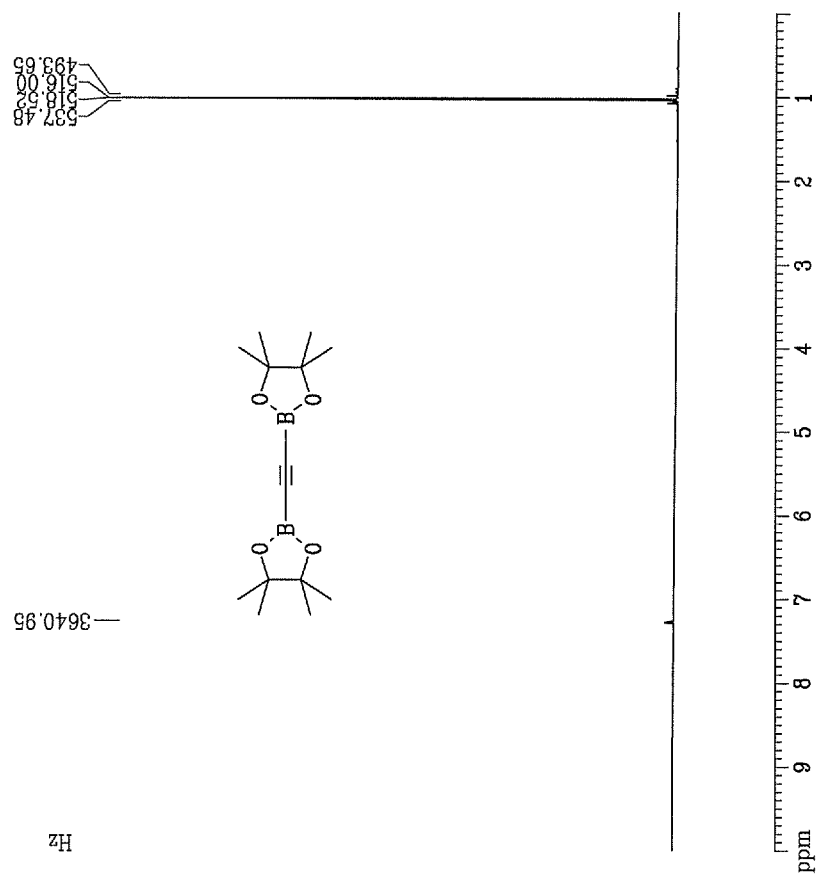
FIG. 1 illustrates the $^1H$ NMR spectrum of [1,2-bis(4',4', 5',5'-tetramethyl[1',3',2']dioxaborolan-2'-yl)ethyne (B2C2) in $C_6D_6$.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In a first aspect, the present invention provides oligomer and polymers, such oligomers and polymers comprising a plurality of aryleneethynylene units composed of arylene units covalently bonded to ethynylene units. Each of the arylene units includes at least one water solubilizing group. Examples of such oligomers and polymers are poly- and oligo-PPES and PNES, both of which are described in additional detail elsewhere herein.

The oligomers or polymers of the present invention include block copolymers, and multi-block polymers; copolymers, and combinations or portions thereof are also within the scope of the present invention.

In the disclosed oligomers or polymers, at least one arylene unit suitably includes ten or fewer fused aromatic ring systems. In some embodiments, the arylene unit includes one (e.g., PPES) ring or two (e.g., PNES) fused rings. Embodiments having additional, multiple fused rings are within the scope of the invention and will be apparent to those of ordinary skill in the are.

An arylene unit suitable for the present invention includes benzene, naphthalene, anthracene, tetracene, pentacene, phenanthrene, pyrene, chrysene, fluoranthrene, and coronene. Also considered suitable are dinaphthochrysene, dibenzochrysene or dibenzo[a,c]triphenylene, phenanthro[1,10,9,8-opqra]perylene-7,14-dione, hexabenzo[bc,ef,hi,kl,no,qr]coronene, dibenzo[a,c]triphenylene, acenaphthotriphenylene, benzo[b]triphenylene, benzo[e]pyrene, benzo[ghi]perylene, benzo[g]chrysene, triphenylene, dibenzo[fg,op]naphthacene.

Other suitable arene units include dibenzo[def,p]chrysene, tribenzo[b,n,pqr]perylene, benzo[ghi]diindeno[1,2,3-cd:1', 2',3'-lm]perylene, tribenzo[hi,o,uv]triphenyleno[2,1,12,11-bcdef]ovalene, naphtho[1,2,3,4-def]chrysene, tetrabenzo[a,cd,j,lm]perylene, ovalene, phenanthro[9,10-b]triphenylene, tetrabenzo[a,c,l,n]pentacene, dibenzo[bc,kl]coronene, benzo[α]coronene, hexabenzo[a,d,g,j,m,p]coronene, diindeno[1,2,3,4-defg:1',2',3',4'-mnop]chrysene, trinaphthylene, naphtho[1,2-g]chrysene, dibenzo[c,p]chrysene, fluorene, fluorenone, fulvalene, acenaphthene, Benzo[α]pyrene, Phenaleno[1,9-fg]isoquinoline, Dibenzo[def,mno]chrysene, Anthra[9,1,2-cde]benzo[rst]pentaphene, Dibenzo[b,def]chrysene, 5H-Benzo[cd]pyrene, Pyranthrene, Dibenzo[cd,lm]perylene, Benzo[rst]pentaphene, Benzo[rst]phenanthro[10,1,2-cde]pentaphene, Benzo[rst]dinaphtho[8,1,2-cde:2',1',8'-klm]pentaphene, fluorescein, rhodamine, rhosamine.

The compound having the structure

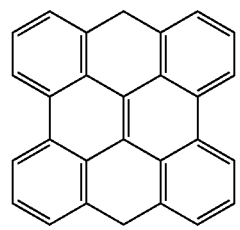

is also considered a suitable arene unit. Combinations of suitable individual arene units are also within the scope of the claimed invention.

The forgoing listing is by no means exclusive. Accordingly, other suitable aryl configurations and embodiments will be apparent to those of ordinary skill in the art, and suitable arylenes are shown in Table 6.

TABLE 6

Suitable Arylenes

Dibenzochrysene or Dibenzo[a,c]tripher

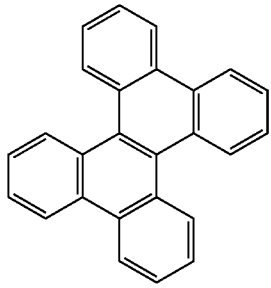

Index name not yet assigned

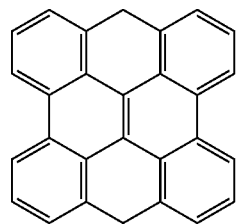

Phenanthro[1,10,9,8-opqra]perylene-7,1

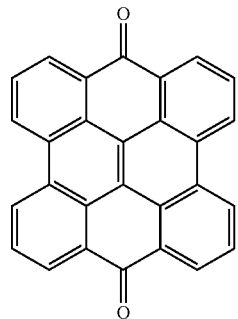

Hexabenzo[bc,ef,hi,kl,no,qr]coronene

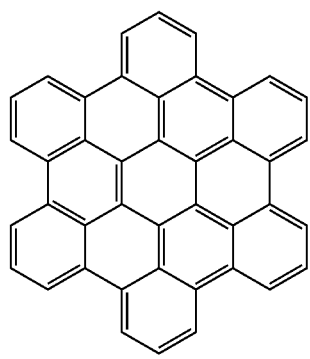

Dibenzo[a,c]triphenylene

TABLE 6-continued

Suitable Arylenes

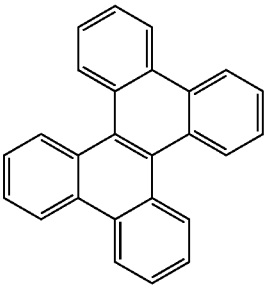

Acenaphthotriphenylene

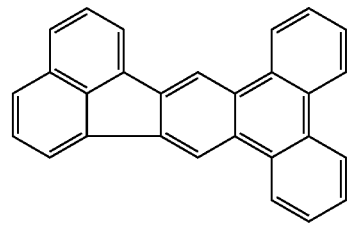

Benzo[b]triphenylene

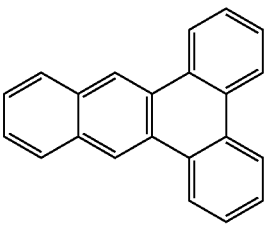

Benzo[e]pyrene

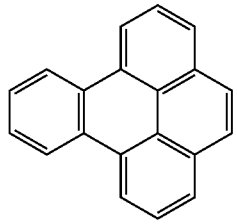

Benzo[ghi]perylene

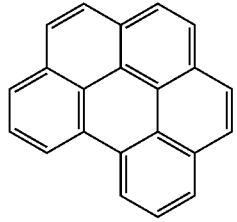

Benzo[g]chrysene

TABLE 6-continued
Suitable Arylenes
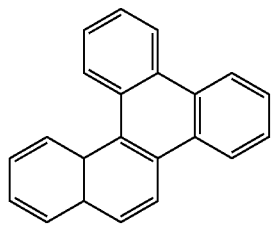
Triphenylene
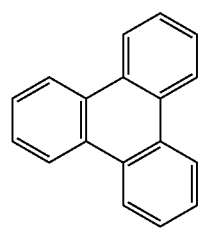
Dibenzo[fg,op]naphthacene
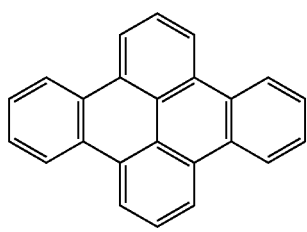
Dibenzo[def,p]chrysene
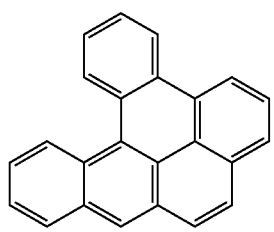
Tribenzo[b,n,pqr]perylene
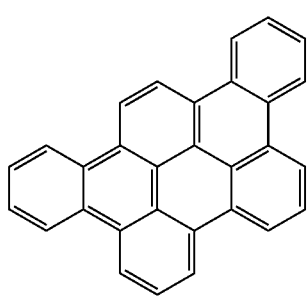
Benzo[ghi]diindeno[1,2,3-cd:1',2',3'-lm]perylene
TABLE 6-continued
Suitable Arylenes
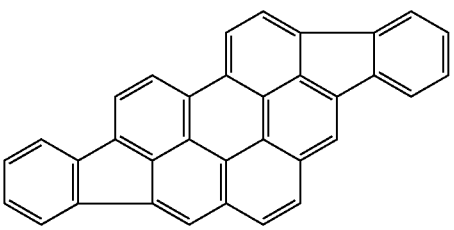
Tribenzo[hi,o,uv]triphenyleno[2,1,12,11-bcdef]ovalene
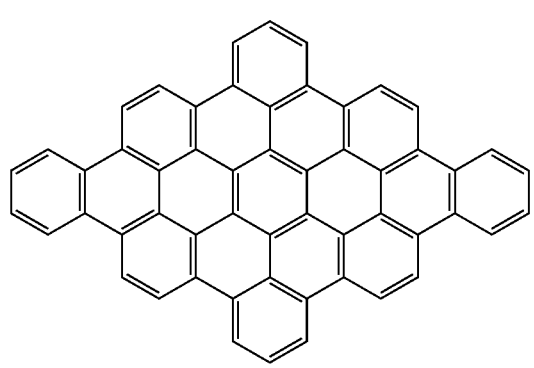
Naphtho[1,2,3,4-def]chrysene
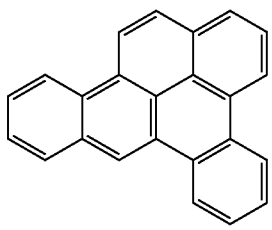
Tetrabenzo[a,c,d,j,lm]perylene
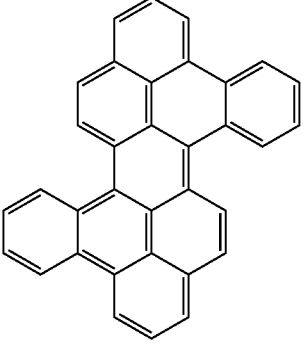
Ovalene
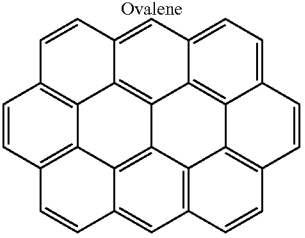
Phenanthro[9,10-b]triphenylene TABLE 6-continued Suitable Arylenes Terrabenzo[a,c,l,n]pentacene Dibenzo[bc,kl]coronene Benzo[a]coronene Hexabenzo[a,d,g,j,m,p]coronene
Benzo[a]pyrene Phenaleno[1,9-fg]isoquinoline Dibenzo[def,mno]chrysene TABLE 6-continued Suitable Arylenes Anthra[9,1,2-cde]benzo[rst]pentaphene Dibenzo[b,def]chrysene 5H-Benzo[cd]pyrene Pyranthrene Dibenzo[cd,lm]perylene Benzo[rst]pentaphene TABLE 6-continued Suitable Arylenes

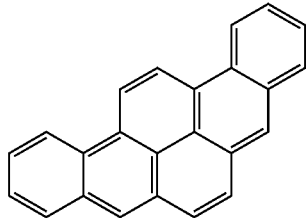

Benzo[rst]phenanthro[10,1,2-cde]pentaphene

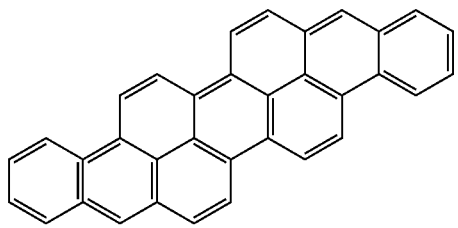

Benzo[rst]dinaphtho[8,1,2-cde:2',1',8'-klm]pentaphene

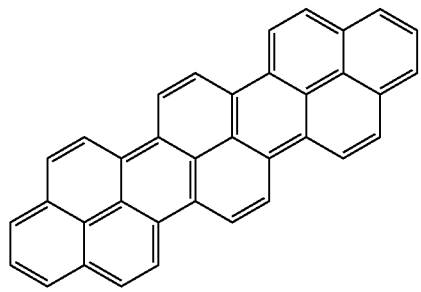

Diindeno[1,2,3,4-defg: 1',2',3',4'-mnop]chrysene

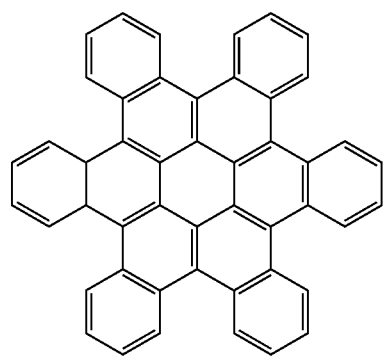

Trinaphthylene

TABLE 6-continued

Suitable Arylenes

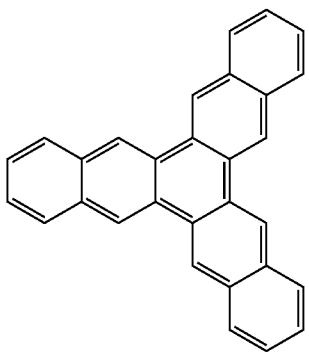

Naphtho[1,2-g]chrysene

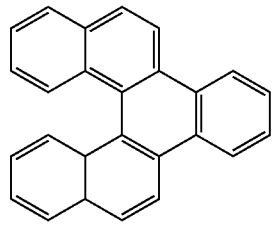

Dibenzo[c,p]chrysene

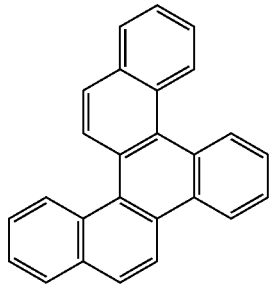

Fluorene
Fluorenone
Fulvalene
acenaphthene
Fluorescein, rhodamine, rhosamine, and many other dyes Water solubilizing groups are contemplated to include a saccharide-, a disaccharide-, and a polysaccharide-group.

A nucleoside-, a dinucleoside-, an oligonucleosides-, a deoxynucleoside-, a dideoxynucleoside-, an oligodeoxynucleosides-, a nucleotide-, a dinucleotide-, an oligonucleotide-, a deoxynucleotide-, a dideoxynucleotide-, an oligodeoxynucleotide-, a peptide-, a dipeptide-, an oligopeptide-, a glycol-, a poly(ethylene oxide)-, and a poly(ethylene glycol)-group, and combinations thereof, are also considered suitable.

A water-solubilizing group may be an acid, a salt, and combinations thereof. In some embodiments, at least one of the water-solubilizing groups is capable of being at least partially ionized in water.

Water-soluble groups include alkoxides and associated derivatives. A non-limiting list of such alkoxides and derivatives includes: an alkoxy sulfonic acid, an alkoxy sulfonic acid lithium salt, an alkoxy sulfonic acid sodium salt, an alkoxy sulfonic acid potassium salt, an alkoxy sulfonic acid rubidium salt, an alkoxy sulfonic acid cesium salt, an alkoxy sulfonic acid francium salt, an alkoxy sulfonic acid ammonium salt, an alkoxy sulfonic acid primary ammonium salt, an alkoxy sulfonic acid secondary ammonium salt, an alkoxy sulfonic acid tertiary ammonium salt, an alkoxy sulfonic acid quaternary ammonium salt, an alkoxy sulfonic acid imidazolium salt, an alkoxy sulfonic acid pyridinium salt, an alkoxy sulfonic acid N-alkylpyridinium salt, an alkoxy sulfuric acid, an alkoxy sulfuric acid lithium salt, an alkoxy sulfuric acid sodium salt, an alkoxy sulfuric acid potassium salt, an alkoxy sulfuric acid rubidium salt, an alkoxy sulfuric acid cesium salt, an alkoxy sulfuric acid francium salt, an alkoxy sulfuric acid ammonium salt, an alkoxy sulfuric acid primary ammonium salt, an alkoxy sulfuric acid secondary ammonium salt, an alkoxy sulfuric acid tertiary ammonium salt, an alkoxy sulfuric acid quaternary ammonium salt, an alkoxy sulfuric acid imidazolium salt, an alkoxy sulfuric acid pyridinium salt, an alkoxy sulfuric acid N-alkylpyridinium salt, an alkoxy phosphonic acid, an alkoxy phosphonic acid lithium salt, an alkoxy phosphonic acid sodium salt, an alkoxy phosphonic acid potassium salt, an alkoxy phosphonic acid rubidium salt, an alkoxy phosphonic acid cesium salt, an alkoxy phosphonic acid francium salt, an alkoxy phosphonic acid ammonium salt, an alkoxy phosphonic acid primary ammonium salt, an alkoxy phosphonic acid secondary ammonium salt, an alkoxy phosphonic acid tertiary ammonium salt, an alkoxy phosphonic acid quaternary ammonium salt, an alkoxy phosphonic acid imidazolium salt, an alkoxy phosphonic acid pyridinium salt, an alkoxy phosphonic acid N-alkylpyridinium salt, an alkoxy phosphoric acid, an alkoxy phosphoric acid lithium salt, an alkoxy phosphoric acid sodium salt, an alkoxy phosphoric acid potassium salt, an alkoxy phosphoric acid rubidium salt, an alkoxy phosphoric acid cesium salt, an alkoxy phosphoric acid francium salt, an alkoxy phosphoric acid ammonium salt, an alkoxy phosphoric acid primary ammonium salt, an alkoxy phosphoric acid secondary ammonium salt, an alkoxy phosphoric acid tertiary ammonium salt, an alkoxy phosphoric acid quaternary ammonium salt, an alkoxy phosphoric acid imidazolium salt, an alkoxy phosphoric acid pyridinium salt, an alkoxy phosphoric acid N-alkylpyridinium salt, a carboxylic acid, an alkoxy carboxylic acid lithium salt, an alkoxy carboxylic acid sodium salt, an alkoxy carboxylic acid potassium salt, an alkoxy carboxylic acid rubidium salt, an alkoxy carboxylic acid cesium salt, an alkoxy carboxylic acid francium salt, an alkoxy carboxylic acid quaternary ammonium salt, an alkoxy carboxylic acid imidazolium salt, an alkoxy carboxylic acid pyridinium salt, an alkoxy carboxylic acid N-alkylpyridinium salt, or any combination thereof. The alkoxide or alkoxy unit of such embodiments also suitably includes from two to eight carbons.

Suitable alkoxide or alkoxy units may also be characterized as O—C1$_n$—R1$_n$—C2$_n$—R2$_n$, —C3$_n$. In this generalized formula, R$_1$ includes, inter alia, an aryl-, a vinyl-, an ethynyl-, a carboxyl-group, an acrylic acid, an acryl, an acrylate ester, an acrylamide, a methacrylate, a methylmethacrylate, a cyanoacrylate, a methyl vinyl ether, a vinylalcohol, a trialkyl(p-vinylbenzyl)ammonium, a dimethylaminomethylacrylamide, a N-methylolacrylamide, β-dimethylaminoethylacrylamide, x-dimethylaminopropylacrylamide, a diacetoneacrylamide, a N-(1,1-dimethyl-3-dimethylaminopropyl)acrylamide, a 2-methacryloxyethyltrimethylammonium, a 3-methacryloyloxy-2-hydroxypropyltrimethylammonium, a 3-acrylamido-3-methylbutyltrimethylammonium, a 2-acrylamido-2-methylpropanesulfonic acid, a 2-acrylamido-2-methylpropanesulfonate, a vinylimidazoliumsulfobetaine, a 2-methacryloxyethylsulfonate, a 3-methacryloyloxy-2-hydroxypropylsulfonate, a vinylphosphonate, a vinylsulfonate, a vinylcarboxylate, a NH—CO group, a NR2$^+$ group, and the like.

R$_2$ is suitably an aryl-, a vinyl-, an ethynyl-, a carboxyl-group, an acrylic acid, an acryl, an acrylate ester, an acrylamide, a methacrylate, a methylmethacrylate, a cyanoacrylate, a methyl vinyl ether, a vinylalcohol, a trialkyl(p-vinylbenzyl)ammonium, a dimethylaminomethylacrylamide, a N-methylolacrylamide, β-dimethylaminoethylacrylamide, χ-dimethylaminopropylacrylamide, a diacetoneacrylamide, a N-(1,1-dimethyl-3-dimethylaminopropyl)acrylamide, a 2-methacryloxyethyltrimethylammonium, a 3-methacryloyloxy-2-hydroxypropyltrimethylammonium, a 3-acrylamido-3-methylbutyltrimethylammonium, a 2-acrylamido-2-methylpropanesulfonic acid, a 2-acrylamido-2-methylpropanesulfonate, a vinylimidazoliumsulfobetaine, a 2-methacryloxyethylsulfonate, a 3-methacryloyloxy-2-hydroxypropylsulfonate, a vinylphosphonate, a vinylsulfonate, a vinylcarboxylate, a NH—CO group, a NR2+ group, and the like. In the generalized formula described herein, C1-C2, and C3 are each suitably an alkyl, an alkylether, or an alkylthioether. In suitable compounds, n is in the range of from 0 to 8.

Water solubilizing groups also include alkyl groups; 3-propoxysulfonic acid is considered especially suitable. A non-inclusive listing of suitable alkyl groups includes: alkyl sulfonic acid, an alkyl sulfonic acid lithium salt, an alkyl sulfonic acid sodium salt, an alkyl sulfonic acid potassium salt, an alkyl sulfonic acid rubidium salt, an alkyl sulfonic acid cesium salt, an alkyl sulfonic acid francium salt, an alkyl sulfonic acid ammonium salt, an alkyl sulfonic acid primary ammonium salt, an alkyl sulfonic acid secondary ammonium salt, an alkyl sulfonic acid tertiary ammonium salt, an alkyl sulfonic acid quaternary ammonium salt, an alkyl sulfonic acid imidazolium salt, an alkyl sulfonic acid pyridinium salt, an alkyl sulfonic acid N-alkylpyridinium salt, an alkyl sulfuric acid, an alkyl sulfuric acid lithium salt, an alkyl sulfuric acid sodium salt, an alkyl sulfuric acid potassium salt, an alkyl sulfuric acid rubidium salt, an alkyl sulfuric acid cesium salt, an alkyl sulfuric acid francium salt, an alkyl sulfuric acid ammonium salt, an alkyl sulfuric acid primary ammonium salt, an alkyl sulfuric acid secondary ammonium salt, an alkyl sulfuric acid tertiary ammonium salt, an alkyl sulfuric acid quaternary ammonium salt, an alkyl sulfuric acid imidazolium salt, an alkyl sulfuric acid pyridinium salt, an alkyl sulfuric acid N-alkylpyridinium salt, an alkyl phosphonic acid, an alkyl phosphonic acid lithium salt, an alkyl phosphonic acid sodium salt, an alkyl phosphonic acid potassium salt, an alkyl phosphonic acid rubidium salt, an alkyl phosphonic acid cesium salt, an alkyl phosphonic acid francium salt, an alkyl phosphonic acid ammonium salt, an alkyl phosphonic acid primary ammonium salt, an alkyl phosphonic acid secondary ammonium salt, an alkyl phosphonic acid tertiary ammonium salt, an alkyl phosphonic acid quaternary ammonium salt, an alkyl phosphonic acid imidazolium salt, an alkyl phosphonic acid pyridinium salt, an alkyl phosphonic acid N-alkylpyridinium salt, an alkyl phosphoric acid, an alkyl phosphoric acid lithium salt, an alkyl phosphoric acid sodium salt, an alkyl phosphoric acid potassium salt, an alkyl phosphoric acid rubidium salt, an alkyl phosphoric acid cesium salt, an alkyl phosphoric acid francium salt, an alkyl phosphoric acid ammonium salt, an alkyl phosphoric acid primary ammonium salt, an alkyl phosphoric acid secondary ammonium salt, an alkyl phosphoric acid tertiary ammonium salt, an alkyl phosphoric acid quaternary ammonium salt, an alkyl phosphoric acid imidazolium salt, an alkyl phosphoric acid pyridinium salt, an alkyl phosphoric acid N-alkylpyridinium salt, a carboxylic acid, an alkyl carboxylic acid lithium salt, an alkyl carboxylic acid sodium salt, an alkyl carboxylic acid potassium salt, an alkyl carboxylic acid rubidium salt, an alkyl carboxylic acid cesium salt, an alkyl carboxylic acid francium salt, an alkyl carboxylic acid quaternary ammonium salt, an alkyl carboxylic acid imidazolium salt, an alkyl carboxylic acid pyridinium salt, an alkyl carboxylic acid N-alkylpyridinium salt, or any combination thereof.

The disclosed oligomers and polymers also include water solubilizing groups where the alkyl unit of the group includes from two to eight carbons. Suitably alkyl units are characterized as $C1_n$-$R1_n$-$C2_n$-$R2_n$-$C3$. In such embodiments, R1 comprises an aryl-, a vinyl-, an ethynyl-, a carboxyl-group, an acrylic acid, an acryl, an acrylate ester, an acrylamide, a methacrylate, a methylmethacrylate, a cyanoacrylate, a methyl vinyl ether, a vinylalcohol, a trialkyl(p-vinylbenzyl) ammonium, a dimethylaminomethylacrylamide, a N-methylolacrylamide, β-dimethylaminoethylacrylamide, χ-dimethylaminopropylacrylamide, a diacetoneacrylamide, a N-(1,1-dimethyl-3-dimethylaminopropyl)acrylamide, a 2-methacryloxyethyltrimethylammonium, a 3-methacryloyloxy-2-hydroxypropyltrimethylammonium, a 3-acrylamido-3-methylbutyltrimethylammonium, a 2-acrylamido-2-methylpropanesulfonic acid, a 2-acrylamido-2-methylpropanesulfonate, a vinylimidazoliumsulfobetaine, a 2-methylacryloxyethylsulfonate, a 3-methacryloyloxy-2-hydroxypropylsulfonate, a vinylphosphonate, a vinylsulfonate, a vinylcarboxylate, a NH—CO group, a NR2+ group or any combination thereof.

Similarly, R2 suitably includes an aryl-, a vinyl-, an ethynyl-, a carboxyl-group, an acrylic acid, an acryl, an acrylate ester, an acrylamide, a methacrylate, a methylmethacrylate, a cyanoacrylate, a methyl vinyl ether, a vinylalcohol, a trialkyl (p-vinylbenzyl)ammonium, a dimethylaminomethylacrylamide, a N-methylolacrylamide, β-dimethylaminoethylacrylamide, χ-dimethylaminopropylacrylamide, a diacetoneacrylamide, a N-(1,1-dimethyl-3-dimethylaminopropyl)acrylamide, a 2-methacryloxyethyltrimethylammonium, a 3-methacryloyloxy-2-hydroxypropyltrimethylammonium, a 3-acrylamido-3-methylbutyltrimethylammonium, a 2-acrylamido-2-methylpropanesulfonic acid, a 2-acrylamido-2-methylpropanesulfonate, a vinylimidazoliumsulfobetaine, a 2-methylacryloxyethylsulfonate, a 3-methacryloyloxy-2-hydroxypropylsulfonate, a vinylphosphonate, a vinylsulfonate, a vinylcarboxylate, a NH—CO group, a NR2+ group or any combination thereof.

C1 is suitably an alkyl, an alkylether, or an alkylthioether, as are C2 and C3. Suitably, n is in the range of from 0 to 8. In some embodiments, n is 3 or 4.

Other suitable water-solubilizing groups include salts and acids. A non-exhaustive listing of suitable groups includes, inter alia, aryl sulfonic acid, an aryl sulfonic acid lithium salt, an aryl sulfonic acid sodium salt, an aryl sulfonic acid potassium salt, an aryl sulfonic acid rubidium salt, an aryl sulfonic acid cesium salt, an aryl sulfonic acid francium salt, and the like.

Other acids and salts are considered suitable options. Such acids and salts include an aryl sulfonic acid ammonium salt, an aryl sulfonic acid primary ammonium salt, an aryl sulfonic acid secondary ammonium salt, an aryl sulfonic acid tertiary ammonium salt, an aryl sulfonic acid quaternary ammonium salt, an aryl sulfonic acid imidazolium salt, an aryl sulfonic acid pyridinium salt, an aryl sulfonic acid N-alkylpyridinium salt, an aryl sulfuric acid, an aryl sulfuric acid lithium salt, an aryl sulfuric acid sodium salt, an aryl sulfuric acid potassium salt, an aryl sulfuric acid rubidium salt, an aryl sulfuric acid cesium salt, an aryl sulfuric acid francium salt, an aryl sulfuric acid ammonium salt, an aryl sulfuric acid primary ammonium salt, an aryl sulfuric acid secondary ammonium salt, an aryl sulfuric acid tertiary ammonium salt, an aryl sulfuric acid quaternary ammonium salt, an aryl sulfuric acid imidazolium salt, an aryl sulfuric acid pyridinium salt, an aryl sulfuric acid N-alkylpyridinium salt, an aryl phosphonic acid, an aryl phosphonic acid lithium salt, an aryl phosphonic acid sodium salt, an aryl phosphonic acid potassium salt, an aryl phosphonic acid rubidium salt, an aryl phosphonic acid cesium salt, an aryl phosphonic acid francium salt, an aryl phosphonic acid ammonium salt, an aryl phosphonic acid primary ammonium salt, an aryl phosphonic acid secondary ammonium salt, an aryl phosphonic acid tertiary ammonium salt, an aryl phosphonic acid quaternary ammonium salt, an aryl phosphonic acid imidazolium salt, an aryl phosphonic acid pyridinium salt, an aryl phosphonic acid N-alkylpyridinium salt, an aryl phosphoric acid, an aryl phosphoric acid lithium salt, an aryl phosphoric acid sodium salt, an aryl phosphoric acid potassium salt, an aryl phosphoric acid rubidium salt, an aryl phosphoric acid cesium salt, an aryl phosphoric acid francium salt, an aryl phosphoric acid ammonium salt.

Salts and acids that include phosphorous are also suitable. Such suitable compounds include an aryl phosphoric acid primary ammonium salt, an aryl phosphoric acid secondary ammonium salt, an aryl phosphoric acid tertiary ammonium salt, an aryl phosphoric acid quaternary ammonium salt, an aryl phosphoric acid imidazolium salt, an aryl phosphoric acid pyridinium salt, an aryl phosphoric acid N-alkylpyridinium salt, a carboxylic acid, an aryl carboxylic acid lithium salt, an aryl carboxylic acid sodium salt, an aryl carboxylic acid potassium salt, an aryl carboxylic acid rubidium salt, an aryl carboxylic acid cesium salt, an aryl carboxylic acid francium salt, an aryl carboxylic acid quaternary ammonium salt, an aryl carboxylic acid imidazolium salt, an aryl carboxylic acid pyridinium salt, an aryl carboxylic acid N-alkylpyridinium salt, or any combination thereof.

A water-solubilizing group also, in some embodiments, includes $NH_3+$, $NH_2R^+$, $NHR_2^+$, $NR_3^+$, immidazolium, pyridinium, N-alkylpyridinium, bipyridinium, $(CH_2)_n$—CO—$NR_2$, and the like. N is suitably in the range of from 2 to 8, and R suitably includes hydrogen, alkyl, aryl, heterocycle, or any combination thereof.

As discussed elsewhere herein, PPES and PNES are both within the scope of the claimed invention. Both PPES and PNES are considered especially suitably examplars of the disclosed polymers and oligomers; synthesis and characterization of both PPES and PNES are discussed in additional detail elsewhere herein.

In a second aspect, the present invention provides oligomers or polymers. The subject oligomers or polymers include a plurality of [aromatic heterocycle]ethynylene units composed of aromatic heterocycle units covalently bonded to ethynylene units, wherein each the aromatic heterocycle units comprises at least one water solubilizing functional group.

It is contemplated that at least one of the aromatic heterocycle units comprises from about 4 to about 20 carbon atoms. Such units may contain 10, 11, or 12, units, depending on the needs of the user and other considersations.

Suitable aromatic heterocycle units will be known to those of ordinary skill in the art. The invention contemplates that at least one aromatic heterocycle unit is suitably a thiophene, a pyridine, a pyrrole, a furan, an oxazole, an indole, a purine, a benzofuran, an indole, a benzothiophene, a carbazole, an imidazole, a thiazole, a pyrazole, a quinoline, a benzo[c][1,2,5]thiadiazole, [1,2,5]thiadiazolo[3,4-g]quinoxaline benzo[1,2-c:4,5-c']bis([1,2,5]thiadiazole), 2H-pyrrole, a benzimidazole, an isoxazole, an isothiazole, 1,2,3-oxadiazole, 1,2,3- triazole, 1,3,4-thadiazole, 2H-pyran, a pyridazine, a pyrimidine, a pyrazine, 1,3,5-triazine, an indolizine, an isoindole, 3H-indole, an indoline, an 1H indazole, a benzthiazole, an 4H-quinolizine, an isoquinoline, a cinnoline, a phtalazine, a quinazoline, a quinoxaline, an 1,8-naphthyridine, a pteridine, an acridine, a phenazine, a phenothiazine, a phenoxazine, an indene, a carboline, an 3-benzazepine, an 1,4-benzodiazepine, a xanthene, 1,2,3-thiadiazole, 1,2,3-triazine, 1,2,4,5-triazine, 1,2,4-thiadiazole, 1,2,4-triazine, 1,2,4-triazole, 1,2,5-oxadiazole, 1,3,4-benzodithiazine, 1,3,5-triazine, 1,3-diazocine, 1,4,2-dithiazine, 1,4-dioxin, 1,4-dithiin, 2H-chromen-2-one, 2H-chromene, 2H-pyran-2-one, 3,1-benzoxazepine, 3,9-diazophenanthrene, 4H-3,1-benzoxazine, 4H-chromen-4-one, 4H-chromene, 4H-pyran, 4H-pyran-4-one, 6H-1,2-oxazine, 6H-1,3-oxazine, azepine, azocine, benzo[b]furan, benzo[b]selenophene, benzo[b]thiphene, benzo[c]selenophene, benzo[c]thiophene, benzodiazine, benzothiazole, benzotriazole, benzoxazole, chroman, cyclotetraene, dibenzo[1,4]dioxin, dibenzo[1,4]oxazine, dibenzofuran, dibenzopyridine, indazole, isobenzofuran, oxepin, oxepine, phenanthridine, phenoxathiin, phosphabenzene, phosphole, phthalazine, pyrido[2,3-d]pyrimidine, pyrido[3,2-d]pyrimidine, pyrido[4,3-c]quinoline, pyridine, quinolizine, quinolizinium, quinozoline, selenophene, tetrazole, thianthrene, thiepine or any combination thereof.

Water-solubilizing groups suitable for inclusion in this aspect of the invention are described in detail elsewhere herein.

The present invention also provides oligomers or polymers. These oligomers or polymers include a plurality of [conjugated macrocycle]ethynylene units composed of a conjugated macrocycle group covalently bonded to an ethynylene group. Each of the conjugated macrocycle groups also suitably includes at least one water solubilizing functional group.

Conjugated macrocyclic groups will be known to those of ordinary skill in the art. A non-exhaustive list of such groups suitably includes, inter alia, a porphyrin-, an N-confused porphyrin, a porphycene-, a rubyrin-, a rosarin-, a hexaphyrin-, a sapphyrin-, a chlorophyll-, a chlorin-, a phthalocynine-, a porphyrazine-, a bacteriochlorophyl-, a pheophytin-, or texaphyrin-based component-, a metalated derivatives thereof, and the like.

Water-solubilizing groups suitable for inclusion in the disclosed oligomers and polymers are described elsewhere herein.

A further aspect of the invention provides the compounds poly[p-{2,5-bis(3-propoxysulfonicacidsodiumsalt)}phenylene]ethynylene, and oligo[p-{2,5-bis(3-propoxysulfonicacidsodiumsalt)}phenylene]ethynylene. Additionally provided are the compounds poly[2,6-{1,5-bis(3-propoxysulfonicacidsodiumsalt)}napthalene]ethynylene and oligo[2,6-{1,5-bis(3-propoxysulfonicacidsodiumsalt)}napthalene]ethynylene.

Figure 13:
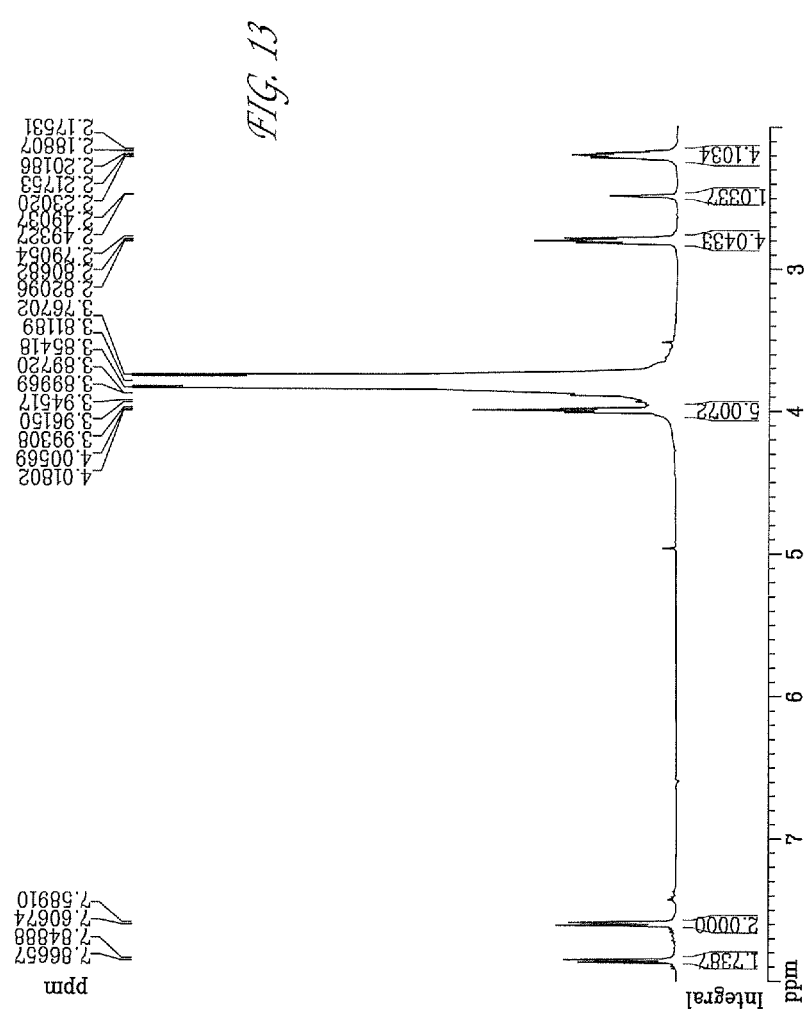
FIG. 13 illustrates ¹H NMR spectrum of {[2,6-diiodo-1,5-bis(3-propoxy-sulfonic acid)napthalene]sodium salt} in DMSO-d₆.
Figure 14:
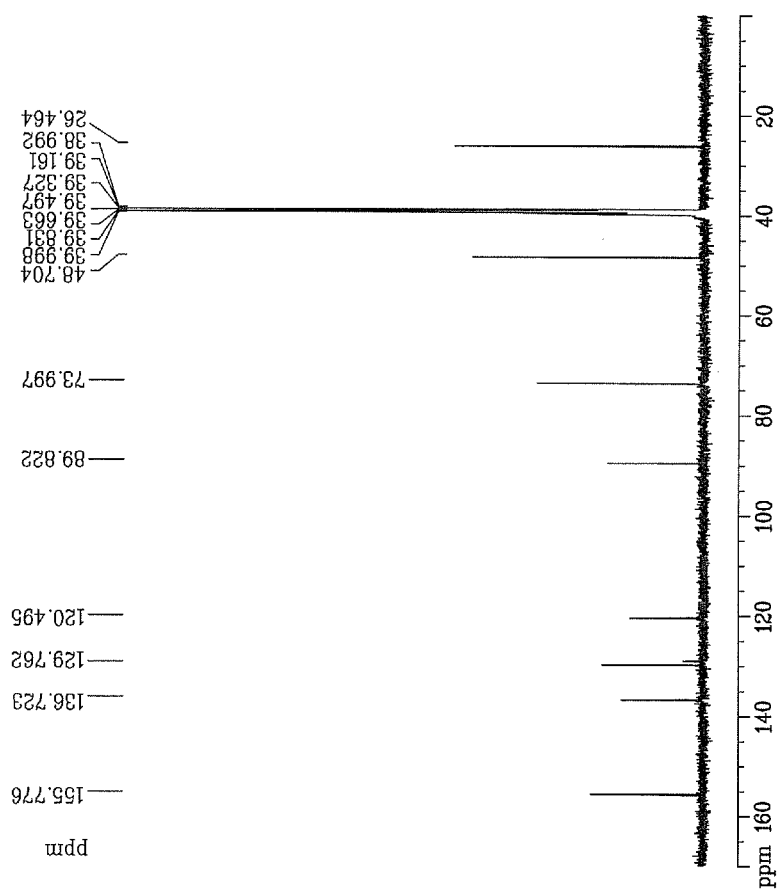
FIG. 14 illustrates ¹³C NMR spectrum of {[2,6-diiodo-1,5-bis(3-propoxy-sulfonic acid)napthalene]sodium salt} in DMSO-d₆.
Figure 15:
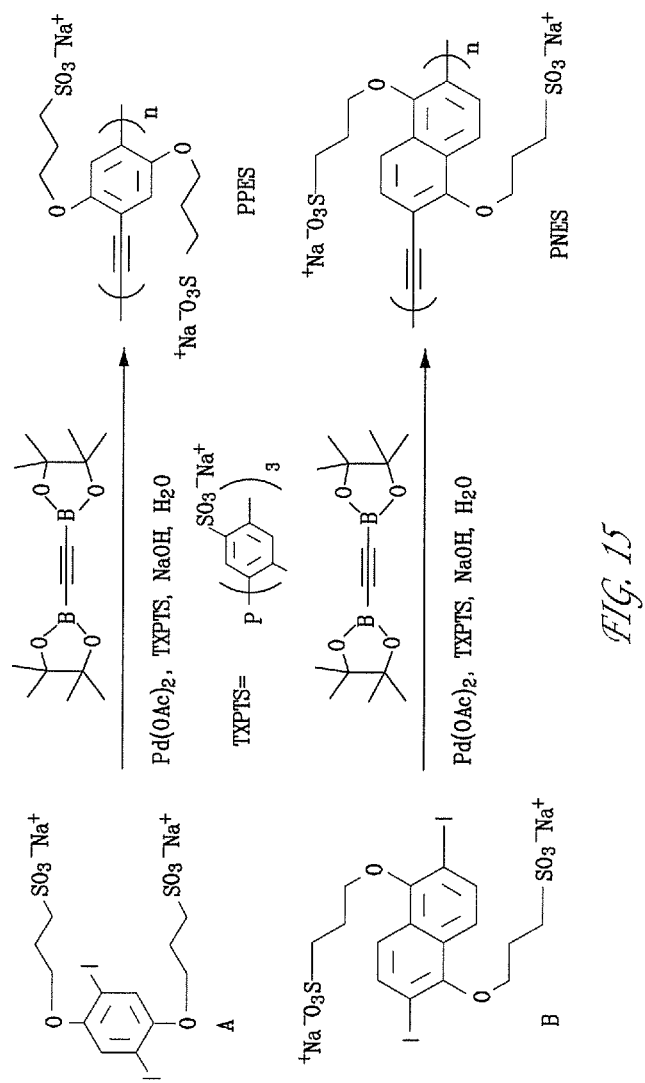
FIG. 15 illustrates an exemplary synthesis scheme for PPES and PNES compounds.
Figure 16:
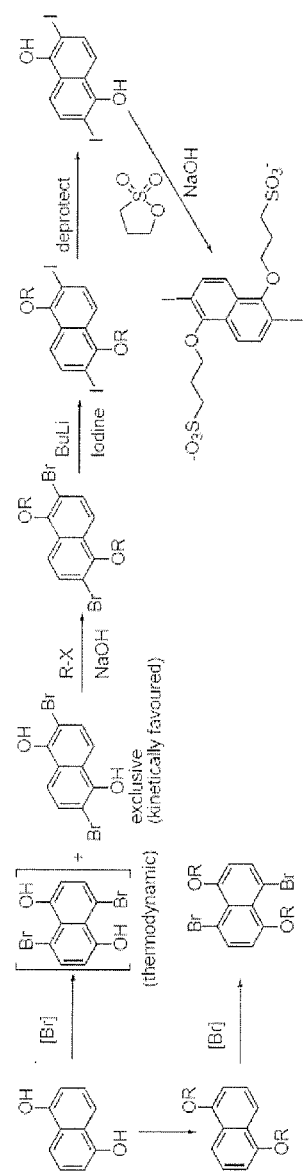
FIG. 16 illustrates an exemplary synthesis scheme for PNES.

FIG. 13 illustrates the $^1$H NMR spectrum of {[2,6-diiodo-1,5-bis(3-propoxy-sulfonic acid)napthalene]sodium salt} in DMSO-$_{d6}$. FIG. 14 illustrates the $^{13}$C NMR spectrum of {[2,6-diiodo-1,5-bis(3-propoxy-sulfonic acid)napthalene] sodium salt} in DMSO-$_{d6}$.

Alkyne compounds that include boron are also disclosed in the present invention. Such compounds are described by the generalized formula (OR)$_2$B—CC—B(OR)$_2$. In the formula, R is suitably hydrogen, an alkyl, a heterocyclic ring, an aryl, and the like; other R substituents suitable for inclusion in the disclosed compounds will be apparent to those of ordinary skill in the art. The boroalkynes may be characterized as, inter alia, coupling agents, synthons, and the like.

Where R is in aryl, there is the proviso that the compound is not any one of the following:

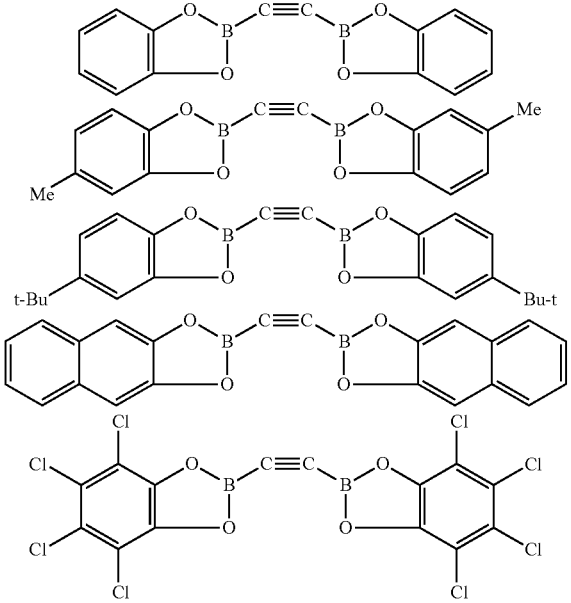

One alkyne including boron that is within the scope of the disclosed compounds is 1,2-bis(4',4',5',5'-tetramethyl[1',3',2']dioxaborolan-2'-yl)ethyne. 1,2-bis(4',4',5',5'-tetramethyl[1',3',2']dioxaborolan-2'-yl)butadiyne is also suitably within the scope of the present invention. Table 1 summarizes the structure determination of 1,2-bis(4',4',5',5'-tetramethyl[1',3',2']dioxaborolan-2'-yl)ethyne.

Further disclosed are additional boron-alkyne compounds. Such compounds are represented by the generalized formula (OR)$_3$B$^-$—CC—B$^-$(OR)$_3$, F$_3$B$^-$—CC—B$^-$F$_3$, (OR)$_2$B—CC—CC—B(OR)$_2$, (OR)$_3$B$^-$—CC—CC—B$^-$(OR)$_3$, F$_3$B$^-$—CC—CC—B$^-$F$_3$, or any combination thereof.

In the foregoing formulae, R is suitably a hydrogen, an alkyl, an aryl, a heterocycle, a conjugated macrocycle, or any combination thereof. Suitable alkyls, aryls, heterocycles, conjugated macrocycles, and the like are discussed in further detail elsewhere herein, and suitable R species will be known to those of ordinary skill in the art.

Also provided are methods for synthesizing an oligomer or a polymer. The disclosed methods include contacting a bis-borylated alkyne and an arene bis([water-solubilizing group]) salt, where the contacting is performed in an aqueous environment.

Scheme 2 sets forth a non-limiting depiction of the present methods, as used to synthesize PPES in that non-limiting example. As shown in that exemplary scheme, the PPES synthesis is performed under aqueous conditions.

In some embodiments, the aqueous environment is neat water. Basic conditions may be suitably employed. The synthesis may suitably be performed under aerobic conditions, although the synthesis may also be performed under anaerobic conditions as well.

The contacting is also suitably performed in the presence of a secondary salt. Tri(4,6-dimethyl-3-sulfonatophenyl)phosphine trisodium is considered especially suitable, particularly when used in conjunction with Pd(OAc)$_2$. Other suitable salts are described in the discussions of alkoxide and alkoxy units and of water-solubilizing groups, elsewhere herein.

Salts having the generalized formula Pd-L, wherein L comprises a water-soluble phosphine ligand are also considered suitable. L can include water soluble phosphite, water soluble arsine, a water soluble Lewis base, and the like. Other suitable L groups will be apparent to those of ordinary skill in the art.

The contacting is also suitably performed in the presence of a catalyst. Suitable catalysts include $Pd(OAc)_2$, $PdCl_2$, $Pd(Acac)_2$, $Pd(OAc)_2$/tri(4,6-dimethyl-3-sulfonatophenyl) phosphine trisodium, or any combination thereof. In some embodiments, the catalyst includes $PdL_2$, $PdCl_2L_2$, $Pd L_4$, and the like. In these embodiments, L is suitably a water-soluble phosphine ligand.

In some embodiments, the contacting is performed under heating. Heating may be supplied by microwaves, infrared, convection, conduction, indirect heating, or direct heating. The heating suitably occurs from about 60° C. to about 200° C. In some suitable embodiments, the heating occurs to about 150° C.

Bisborylated alkynes suitable for the claimed methods include compounds having the generalized formulae: $(OR)_2B$—CC—$B(OR)_2$, $(OR)_3B^-$—CC—$B^-(OR)_3$, $F_3B^-$—CC—$B^-F_3$, $(OR)_2B$—CC—CC—$B(OR)_2$, $(OR)_3B^-$—CC—CC—$B^-(OR)_3$, $F_3B^-$—CC—CC—$B^-F_3$, $(OR)_3B^-$—CC—$B^-(OR)_3$, $F_3B^-$—CC—$B^-F_3$, $(OR)_2B^-CC$—CC—$B(OR)_2$, $(OR)_3B^-$—CC—CC—$B^-(OR)_3$, $F_3B^-$—CC—CC—$B^-F_3$, and combinations.

In the foregoing formulae, R suitably comprises a hydrogen, an alkyl, a cyclic alkane, an aryl, a heterocycle, a conjugated macrocycle, or any combination thereof.

Suitable aryls include those aryls described elsewhere herein. Suitable alkyls, heterocycles, conjugated macrocycles, and the like are described elsewhere herein. Cyclic alkanes suitable for the claimed methods will be apparent to those of ordinary skill in the art.

1,2-bis(4',4',5',5'-tetramethyl[1',3',2']dioxaborolan-2'-yl) ethyne and 1,2-bis(4',4',5',5'-tetramethyl[1',3',2']dioxaborolan-2'-yl)butadiyne are both considered especially suitable. The bisborolated alkyne is not limited to bisborolated ethynes, and includes bisborolated butadiyne compounds as well. Bisborolated poly-ynes are also suitable for use in the claimed invention.

The arene bis([water-solubilizing group]) salt used in the claimed methods suitably includes ten or fewer fused aromatic ring systems. In some embodiments, the arene bis([water-solubilizing group]) is a dihaloarene, a di(triflate)arene, a di(tosylate)arene a di(azide)arene, and combinations thereof and the like.

The arene bis([water-solubilizing group]) salt also suitably includes one or more water-solubilizing groups. Suitable water-solubilizing groups are described elsewhere herein in more detail, and include acids and salts.

It is contemplated that at least one of the water-solubilizing groups is capable of being at least partially ionized in water. Groups exhibiting this suitable behavior will be known to those of ordinary skill in the art.

Polymers and oligomers synthesized according to the present methods are also within the scope of the present invention.

A second non-limiting embodiment of the present methods is shown in Scheme 3. In that scheme, the disclosed methods are used to synthesize PNES from 2,6-Diiodo-1,5-hydroxynapthanol. As shown, synthesis is performed in the presence of a secondary salt and a catalyst.

Also provided are methods for synthesizing alkyne synthons. The disclosed methods include contacting an ethyne dianion with a dioxaborolane to give rise to a boro-alkyne and contacting the boro-alkyne with an acid.

Scheme 1 provides an exemplary, non-limiting depiction of the claimed methods. The method shown in Scheme 1 is generalizable to other reactants and compounds not shown in that scheme.

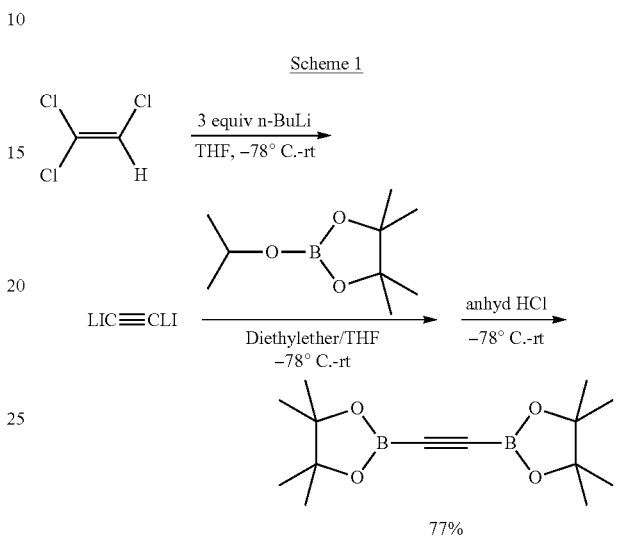

Scheme 4 also provides an exemplary, non-limiting depiction of the claimed methods, showing reaction of metal alkynes with boron-containing compounds, such as dioxaborolanes. Without being bound to any particular theory of operation, it is believed that the ethyne dianion interacts with the dioxaborolane so as to give rise to a charged alkyne species that is neutralized by the addition of an acid.

-continued

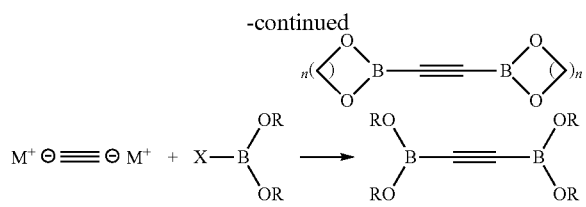

Suitable dioxaborolanes include compounds having the formula $BO_2C_n$, and suitably include ring structures. One non-limiting exemplar compound is:

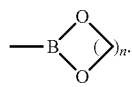

Another suitable compound is

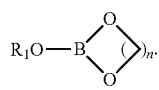

In such compounds, n is suitably in the range of from 1 to 10. R1 is suitably a hydrogen, an alkyl-, an aryl-, or a heterocycle-group, or any combination thereof.

In other embodiments, the dioxaborolane comprises a compound having the formula $B(OR)_3$. Suitable R species are described elsewhere herein. 2-Isopropoxy-4,4,5,5-tetramethyl-1,3,2-dioxaborolane and 2-isopropoxy-4,4,5,5-tetramethyl-1,3,2-dioxaborolane, and combinations thereof, are considered especially suitable dioxaborolanes. Other suitable dioxaborolanes will be known to those of ordinary skill in the art.

Contacting the ethyne dianion with a dioxaborolane suitably occurs at less than about 0° C. The contacting may even occur at less than about −50° C.

The contacting also suitably occurs in the presence of a solvent. Solvents suitable for use in the claimed methods include THF, dialkylether, DME, glyme, tetraglyme, and combinations thereof.

Contacting the boro-alkyne with an acid occurs at less than about 0° C., or even at less than about −50° C. Anhydrous organic acids are considered especially suitable, and anhydrous HCl, anhydrous HBr, anhydrous HI, anhydrous $HNO_3$, anhydrous $H_2SO_4$, anhydrous $H_3PO_4$, and combinations thereof are all suitable.

The method gives rise to a compound having the formula $(OR)_2B$—CC—$B(OR)_2$, $(OR)_3B^-$—CC—$B^-(OR)_3$, $F_3B^-$—CC—$B^-F_3$, $(OR)_2B$—CC—CC—$B(OR)_2$, $(OR)_3B$—CC—CC—$B^-(OR)_3$, $F_3B^-$—CC—CC—$B^-F_3$, and combinations thereof.

As set forth elsewhere herein, R suitably includes a hydrogen, an alkyl, a heterocycle, or any combination thereof. 1,2-bis(4',4',5',5'-tetramethyl[1',3',2']dioxaborolan-2'-yl) ethyne and 1,2-bis(4',4',5',5'-tetramethyl[1',3',2']dioxaborolan-2'-yl)butadiyne, are both expected, suitable products of the claimed methods. Synthon compounds made according to the claimed method are also within the scope of the claimed invention.

EXAMPLES

Figure 2:
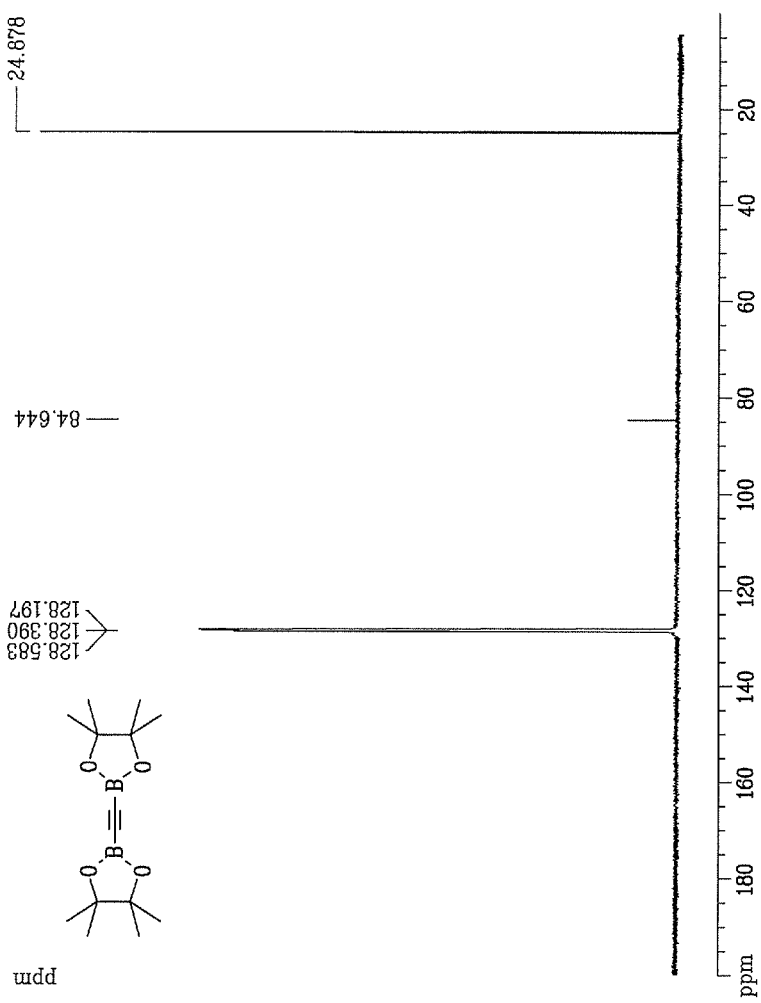
FIG. 2 illustrates the $^{13}C$ NMR spectrum of B2C2 in $C_6D_6$.
Figure 3:
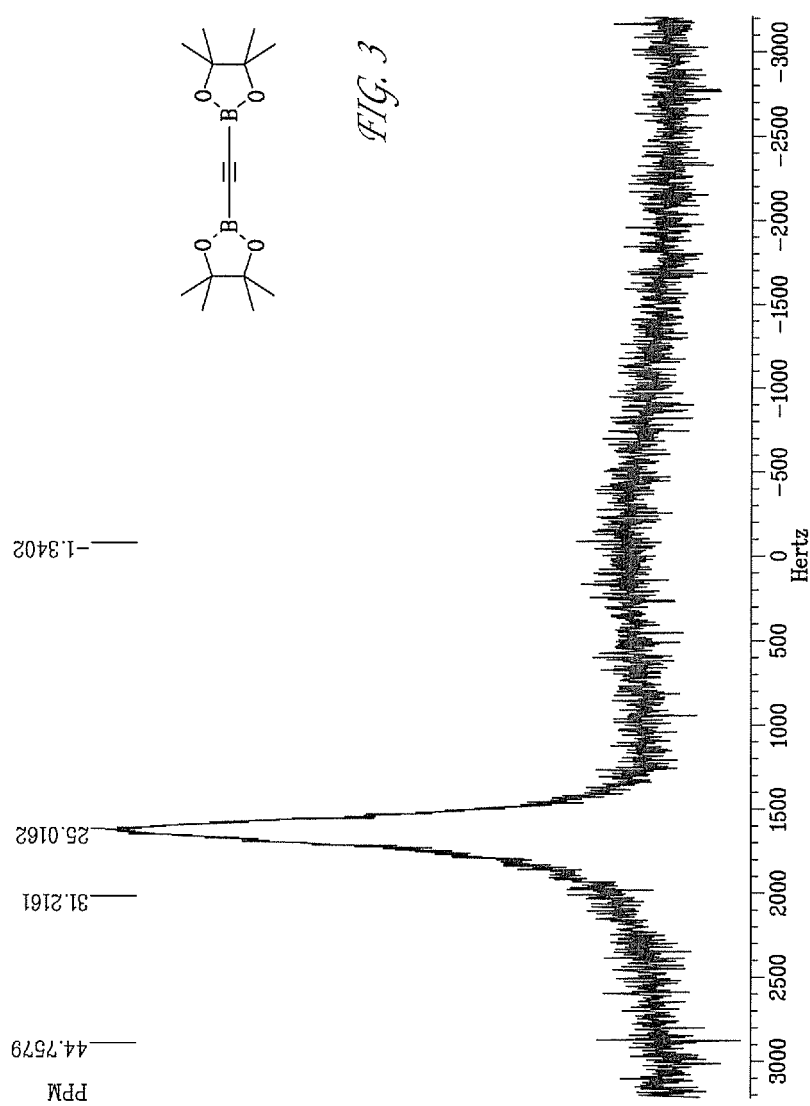
FIG. 3 illustrates $^{11}B$ NMR spectrum of B2C2 in $C_6D_6$.

Certain reactions involving alkynylboranes, alkynylboronic acid or alkynylborate derivatives, and alkynyltrifluoroborates are accepted. Reactions involving reagents that possess boron functionality at the 1- and 2-carbon positions of ethyne, however, have not yet been reported. This motivated the synthesis of [1,2-bis(4',4',5',5'-tetramethyl[1',3',2'] dioxaborolan-2'-yl)ethyne (B2C2). The $^1$H NMR spectrum of B2C2 is shown in FIG. 1. FIG. 2 depicts the $^{13}$C NMR spectrum of B2C2 in $C_6D_6$, and FIG. 3 depicts the $^{11}$B NMR spectrum of B2C2 in $C_6D_6$.

Reaction of dilithioacetylide with 2-isopropoxy-4,4,5,5-tetramethyl-1,3,2-dioxaborolane, followed by treatment with anhydrous HCl, cleanly afforded B2C2 in high yield (Scheme 1). B2C2 was recrystallized from hexanes, giving a robust crystalline solid (mp=270° C.) that is stable under ambient atmosphere for at least 1 year. B2C2 exhibited high solubility in basic water and virtually all organic solvents.

X-ray quality crystals of B2C2 were obtained via evaporation of a benzene solution. During the process of structure determination, it became obvious that there were problems with the data: refinement of the structure was unstable and anisotropic refinement produced several nonpositive definite thermal parameters. A re-examination of the rotation images revealed many reflections that did not fit the derived cell.

The crystal was found to be twinned with a total of four components (components 1 and 2 were related by a rotation of 180° around the normal to 110; components 1 and 3 were related by a rotation of 180° around the normal to 001h; components 1 and 4 were related by a rotation of 180° around the normal to 11h0). Twin indexing and processing of twinned data were performed by the TwinSolve37 module of CrystalClear™ (Rigaku Corp.)

Figure 9A:
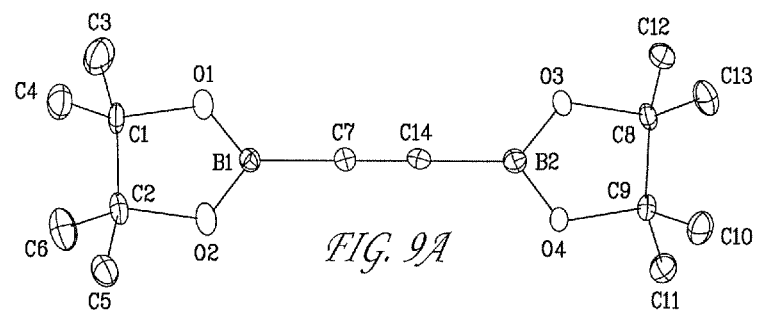
FIG. 9 illustrates ORTEP views of (a) B2C2-1 and (b) B2C2-2 with thermal ellipsoids at 30% probability.
Figure 9B:
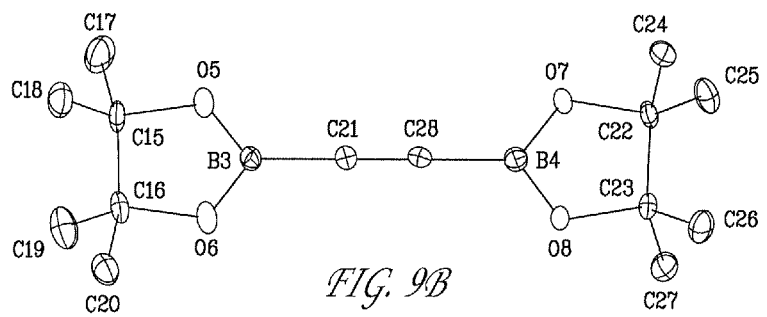

ORTEP representations of the two B2C2 forms (B2C2-1 and B2C2-2) that define the asymmetric crystal-lographic unit are depicted in FIG. 9; structural factors, bond distances, and bond angles are tabulated in Supporting Information—PPES, set forth elsewhere herein. B2C2 featured a standard C—C triple bond distance of 1.20 Å.

Figure 7:
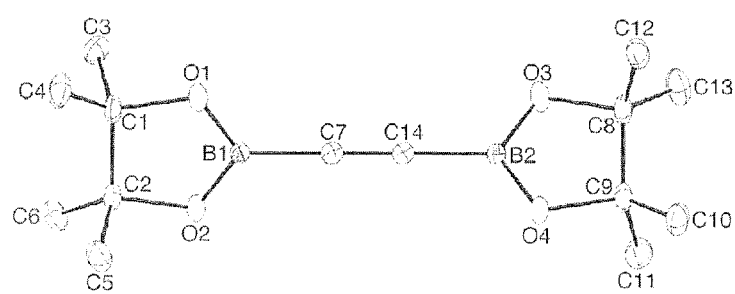
FIG. 7 illustrates ORTEP drawing of B2C2-1 of the asymmetric unit with 30% probability thermal ellipsoids.
Figure 8:
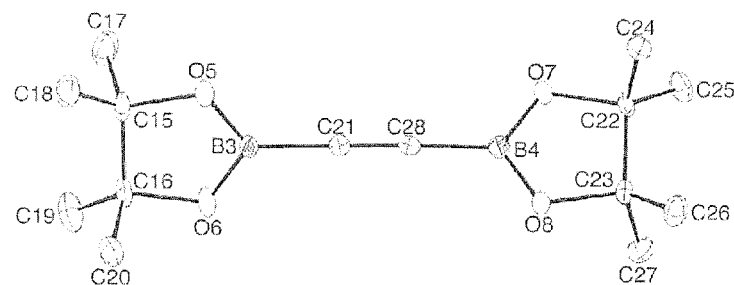
FIG. 8 illustrates ORTEP drawing of B2C2-2 of the asymmetric unit with 30% probability thermal ellipsoids.

FIG. 7 depicts an ORTEP drawing of B2C2-1 of the asymmetric unit with 30% probability thermal ellipsoids. An ORTEP drawing of B2C2-2 of the asymmetric unit with 30% probability thermal ellipsoids is shown in FIG. 8.

Polymerization reactions of B2C2 with {[2,5-diiodo-1,4-bis(3-propoxy-sulfonicacid) benzene]sodium salt} catalyzed by $Pd(OAc)_4$/tris(3-sulfonatophenyl)phosphine trisodium salt (TPPTS) were evaluated in DMF, EtOH, and $H_2O$ at 80° C. (Scheme 2, protocol a). Only the reactions carried out in DMF solvent gave appreciable conversion of polymer.

Figure 10:
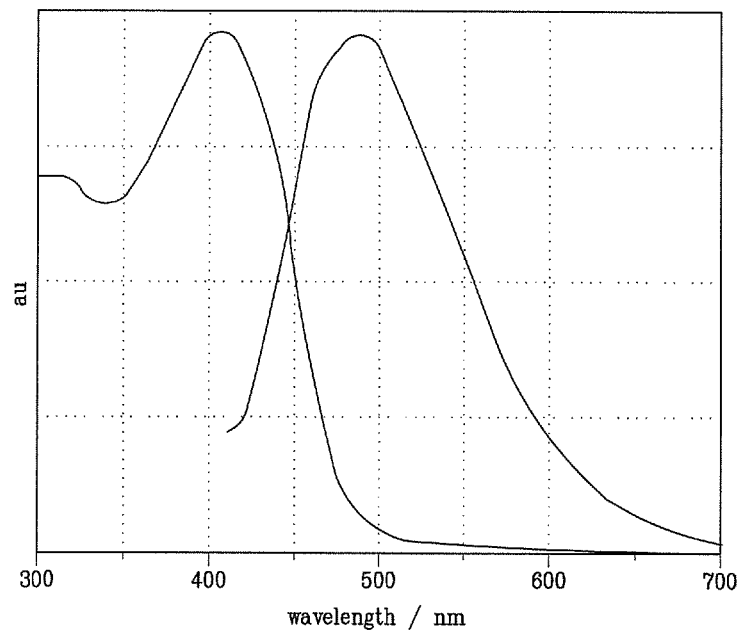
FIG. 10 illustrates absorption and emission spectra of PPES obtained via the synthetic procedure outlined in Scheme 2, protocol b, the solvent was deionized H20, T=296 K, λex=390 nm, and fluorescence quantum yield ($\Phi_f$)=0.064.

Two recent advances in the palladium catalyzed Suzuki-Miyaura reaction have utilized microwave heating and employed tris(4,6-dimethyl-3-sulfonatophenyl)phosphine trisodium salt (TXPTS) as a water-soluble catalyst ligand. Utilizing the microwave heating reaction conditions outlined in Scheme 2 (protocol b), poly[p-{2,5-bis(3-propoxysulfonicacidsodiumsalt)}phenylene]ethynylene (PPES) can be produced in high conversion in aqueous solvent. Interestingly, this aqueous polymerization reaction can also be accomplished under an aerobic atmosphere; in this case, the conversion to polymer product (85%) was slightly lower than that realized under inert conditions (91%; see Supporting Information—PPES for procedural details). GPC analysis of PPES showed that the number averaged molecular weight (Mn) ranges from 6.6 to 17.5 kD depending on the reaction conditions, which corresponds to degrees of polymerization (DP) of 18-47. Representative absorption and emission spectra of PPES (DP≈30) in $H_2O$ are shown in FIG. 10.

Scheme 2

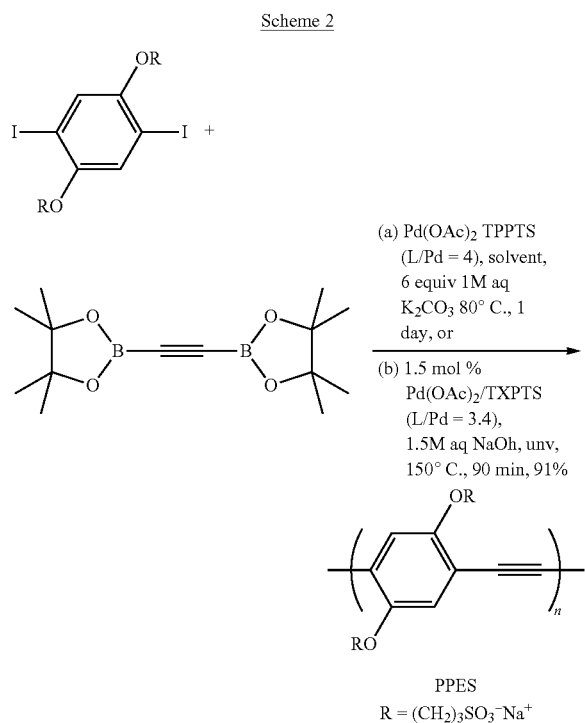

PPES
R = $(CH_2)_3SO_3^-Na^+$

Reagents: (a) Pd(OAc)$_2$ TPPTS (L/Pd = 4), solvent, 6 equiv 1M aq K$_2$CO$_3$ 80° C., 1 day, or (b) 1.5 mol % Pd(OAc)$_2$/TXPTS (L/Pd = 3.4), 1.5M aq NaOh, unv, 150° C., 90 min, 91%

The polymerization reaction, but PPES workup and purification steps can be carried out entirely in the aqueous phase as well. In contrast to other methods in the art, PPES was isolated simply via size exclusion chromatography (Supporting Information—PPES) using only unbuffered deionized water as an eluent. Given the nature of the small molecular weight impurities present in this synthesis of water-soluble PPES, the size exclusion stationary phase can be regenerated for subsequent PPES purifications simply by washing with water.

PPES $^{13}$C NMR spectra in D$_2$O/DMSO-d$_6$ cosolvent showed a broad ethynyl peak at 93 ppm (Supporting Information—PPES); no resonances were evident between 75 and 85 ppm, where butadiynyl carbon peaks usually appear. The absence of any detectable absorption signatures in this spectral region indicates that PPES polymer chain butadiyne defects are suppressed in this synthesis. PPEs prepared via Suzuki-Miyaura polycondensation of 1,4-benzenediboronic acid derivatives and 1,4-bis(2-bromoethynyl)benzene also show no evidence of butadiynyl signatures in $^{13}$C NMR; these results and those presented herein underscore the utility of Suzuki-Miyaura polycondensation over Sonogashira polymerization conditions for the production of butadiyne defect free PPE.

In sum, the synthesis and structure of a novel ethyne synthon, 1,2-bis(4',4',5',5'-tetramethyl[1',3',2]-dioxaborolan-2'-yl)ethyne (B2C2) is disclosed. Shown also is the utility of B2C2 in the Suzuki-Miyaura polycondensation reaction, synthesizing a water-soluble poly(p-phenyleneethynylene) (PPES) from {[2,5-diiodo-1,4-bis(3-propoxy-sulfonicacid)benzene]sodium salt} in neat water under an aerobic atmosphere. This environmentally benign protocol for the preparation of ethyne-bridged conjugated polymers overcomes key drawbacks of commonly employed Sonogashira coupling and acyclic diyne metathesis methods, which include: the introduction of butadiyne defects along the polymer backbone, a requisite inert-atmosphere, and incompatibility of water-solubilizing functional groups with oligomerization reaction conditions Importantly, this conjugated rigid-rod polymer synthesis represents an example in which polymerization, purification, and isolation steps can be accomplished using only H$_2$O as a solvent.

Additional Information—PPES

Materials

All manipulations were carried out under nitrogen prepurified by passage through an O$_2$ scrubbing tower (Schweizerhall R3-11 catalyst) and a drying tower (Linde 3-Å molecular sieves) unless otherwise noted. Standard Schlenk techniques were employed to manipulate air sensitive solutions. All solvents utilized in this work were obtained from Fisher Scientific (HPLC grade). Tetrahydrofuran (THF) and diethylether were dried over K/benzoylbiphenyl and subsequently distilled from these reagents under nitrogen. Hexanes and benzene were used without further purification.

Trichloroethylene, n-BuLi, 2-isopropoxy-4,4,5,5-tetramethyl-1,3,2-dioxaborolane, anhydrous HCl (1 M in diethylether), borontribromide, 1,3-propanesultone, and the catalyst, Pd(OAc)$_2$, were obtained from Aldrich, while tri(3-sulfonatophenyl)phosphine trisodium (TPPTS), tri(4,6-dimethyl-3-sulfonatophenyl)phosphine trisodium (TXPTS) were obtained from Strem. Sodium hydroxide was obtained from Fisher Scientific. 2,5-Diiodohydroxyquinone and {[2,5-diiodo-1,4-bis(3-propoxy-sulfonic acid)benzene]sodium salt} were synthesized according to the procedure published in the literature. Zhou, Q.; Swager, T. M. J. Amer. Chem. Soc. 1995, 117, 12593-12602; Tan, C. Y.; Pinto, M. R.; Schanze, K. S. Chem. Commun 2002, 446-447. Chromatographic purification (Bio-Gel® P-4 Gel 90-180 µm, Bio-Rad Laboratories) of polymer compounds was performed on the bench top.

Instrumentation.

Electronic spectra were recorded on an OLIS UV/vis/NIR spectrophotometry system that is based on the optics of a Cary 14 spectrophotometer. Emission spectra were recorded on a SPEX Fluorolog luminescence spectrophotometer that utilized a T-channel configuration with a red sensitive 82658 Hamamatsu PMT detector: these spectra were corrected for variations in photomultiplier response over wavelength using correction curves generated from the spectral output of a calibrated light source supplied by the National Bureau of Standards. All spectroscopic measurements were carried out at 23±1° C. The fluorescence quantum yield was determined using quinine sulfate (Φ=0.546 in 1.0 N H$_2$SO$_4$, OD$_{350}$=0.015) as a standard. All solutions were purged with nitrogen prior to measurements. Solutions of OD($\lambda_{max}$) ~1.0 (76 mg/L) and OD($\lambda_{max}$) ~0.015 were used for UV-visible absorption and fluorescence measurements, respectively.

NMR spectra were recorded on a 500 MHz AC-Bruker spectrometer. Chemical shifts for $^1$H NMR spectra are relative to residual protium in the deuterated solvents (C$_6$D$_6$, δ=7.20 ppm, D$_2$O=4.75 ppm). $^{13}$C NMR spectra are also referenced to deuterated solvents (C$_6$D$_6$, β=128 ppm, DMSO-d$_6$=39.5 ppm), while those for $^{11}$B NMR spectra are relative to BF$_3$-etherate (0.00 ppm).

Elemental analysis were performed on a Perkin Elmer 2400 from the Micro-Analysis Inc. The molecular weights of polymers were determined by GPC using a Waters Alliance GPCV 2000 system equipped with Waters Ultrahydrogel columns, a Waters 1525 solvent delivery system, a Waters 1525 refractive index detector, and a flow rate of 1.0 mL/min in H$_2$O. Molecular weights are reported relative to Pullulan polymer standards purchased from Sigma-Aldrich, Inc. Microwave assisted reactions were performed with Emrys Personal Chemistry System (Biotage).

Synthesis 1,2-Bis(4',4',5',5'-tetramethyl[1',3',2']dioxaborolan-2'-yl) ethyne (B2C2)

A 250 mL, three-necked, round-bottomed flask equipped with a dropping funnel, stopcock, previously dried at 150° C. for more than three hours and cooled under nitrogen, was charged with 30 mL (75 mmol) of n-BuLi (2.5 M in hexane) and 100 mL of 1:1 mixture of freshly distilled $Et_2O$ and THF under nitrogen. After cooling the solution to −78° C., 2.25 mL (25 mmol) of trichloroethylene in 25 mL $Et_2O$ were added drop wise into the stirred solution. The mixture was allowed to warm to room temperature.

After stirring for 12 h, the mixture was full of white solids, which indicated the formation of the dilithioacetylide. This mixture was cooled to −78° C. A 500 mL flask similarly dried but fitted with an mechanical stirrer, was charged with 2-isopropoxy-4,4,5,5-tetramethyl-1,3,2-dioxaborolane (10 mL, 49 mmol) in 100 mL $Et_2O$ and the reaction mixture was cooled to −78° C. The dilithioacetylide from the first flask was slowly added to the second using a double-ended Teflon tube. The reaction mixture was maintained at −78° C. for 4 h, and then was allowed to warm to room temperature.

After stirring for 2 h at room temperature, the reaction mixture was cooled to −78° C. Anhydrous HCl (50 mL, 50 mmol, 1M solution in $Et_2O$) was added. The cooling bath was removed and the reaction mixture was allowed to warm to room temperature. After removal of the precipitated LiCl by quick filtration through a silica gel pad and washing with anhydrous $Et_2O$, all volatiles were removed under reduced pressure. The white solids were transferred into a thimble and were subject to Soxhlet extraction using hexanes. Cooling the hexanes solution affords pure white crystals; isolated yield=5.4 g (77% based on 25 mmol trichloroethylene). $^1$H NMR (500 MHz, $C_6D_6$ as 7.20 ppm): δ 0.96 $^{13}$C NMR (500 MHz, $C_6D_6$ as 128 ppm): δ 84.25, 24.49 $^{11}$B NMR (250 MHz, $CDCl_3$, $BF_3$-etherate as standard 0 ppm): δ 25.02; mp 270° C. with simultaneous decomposition; Elemental Analysis $C_{14}H_{24}B_2O_4$ (Mol. Wt.: 277.96): Calc: C, 60.50; H, 8.70. Found: C, 60.14; H, 8.95.

General Procedure of PPES Synthesis Under Inert Atmosphere:

A 5 mL microwave vial (Biotage) was charged with {[2,5-diiodo-1,4-bis(3-propoxy-sulfonic acid)benzene]sodium salt}, 1,2-Bis(4',4',5',5'-tetramethyl[1',3',2']dioxaborolan-2'-yl)ethyne, Pd(OAc)$_2$, tri(4,6-dimethyl-3-sulfonatophenyl) phosphine trisodium (TXPTS),$^4$ and a magnetic stir bar. After sealing with a vial cap, this vessel was subject to vacuum and charged with nitrogen. The vacuuming/charging cycle was repeated 3 times. An aqueous 1.5 M NaOH solution, previously degassed with nitrogen for 1 h, was added via syringe. The vessel was placed into the microwave cavity. The reaction mixture was stirred at room temperature for 1 min and then microwave irradiated at 30 W. The temperature was ramped from room temperature to the set point.

Once the set temperature was reached, the reaction mixture was held at that temperature for a designated time period. After the mixture was allowed to cool to room temperature, the reaction vessel was opened. The resulting solution was viscous, greenish brown in color and exhibited an intense yellowish green fluorescence when illuminated with a 365 nm UV lamp. This solution was diluted with deionized water and then filtered through a glass frit and filter paper, successively. The filtrate was concentrated to about 3 mL, and loaded on the top of the size exclusion column (2×50 cm) packed with Bio-Gel® P-4 Gel (90-180 µm, Bio-Rad Laboratories). Running size exclusion chromatography with deionized water without any additional buffer, enabled the separation of a yellowish green product band. Following evaporation of the solvent, a glossy film was obtained. The molecular weight of PPES was determined to be 6.6-17.5 kD by GPC, which corresponds to a degree of polymerization (DP) of 18~47.

Figure 4:
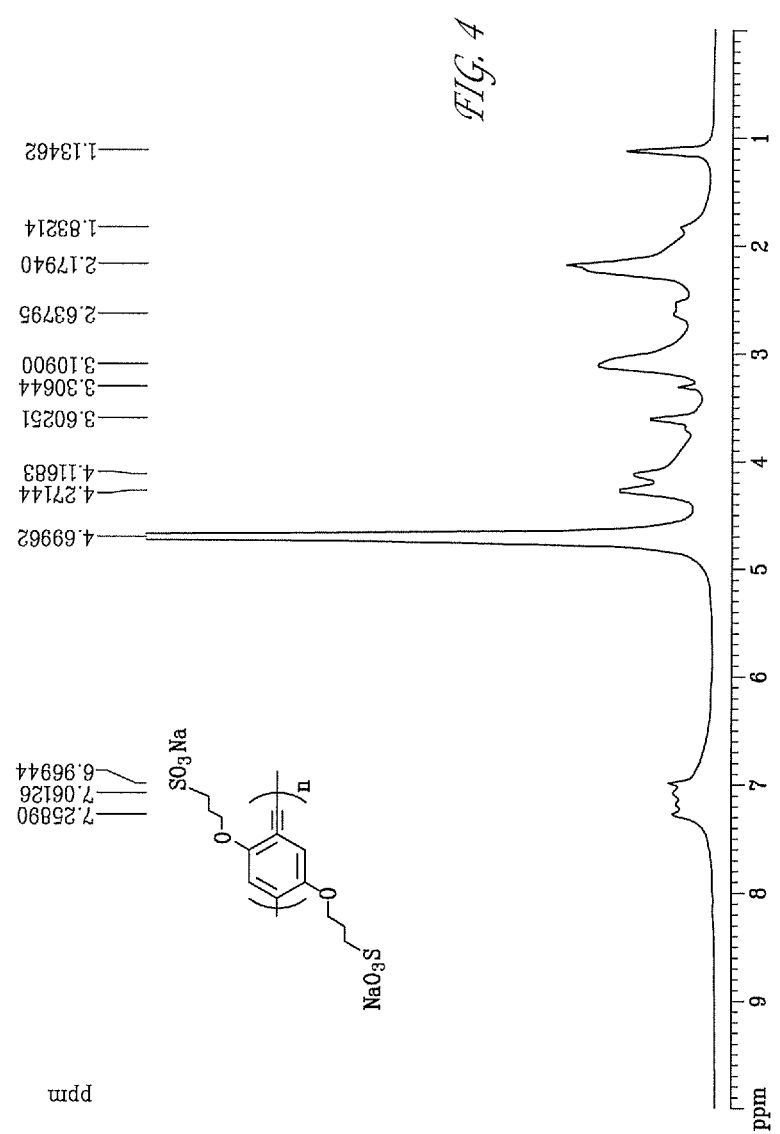
FIG. 4 illustrates $^1H$ NMR spectrum of poly[p-{2,5 bis-(3-propoxysulfonic acidsodium salt)}phenylene]ethynylene (PPES) in $D_2O$.
Figure 5:
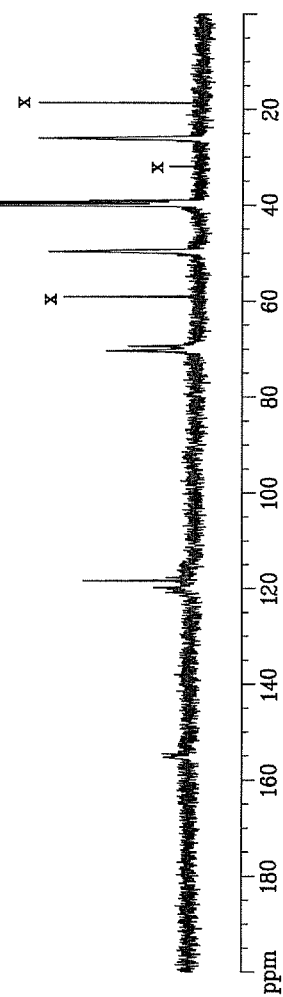
FIG. 5 illustrates the $^{13}C$ NMR spectrum of PPES in $D_2O$/DMSO-$d_6$ co-solvent.

The $^1$H NMR spectrum of a representative PPES sample in $D_2O$ is shown in FIG. 4, and the $^{13}$C NMR spectrum of PPES in $D_2O$/DMSO-$d_6$ co-solvent is depicted in FIG. 5.

Figure 6:
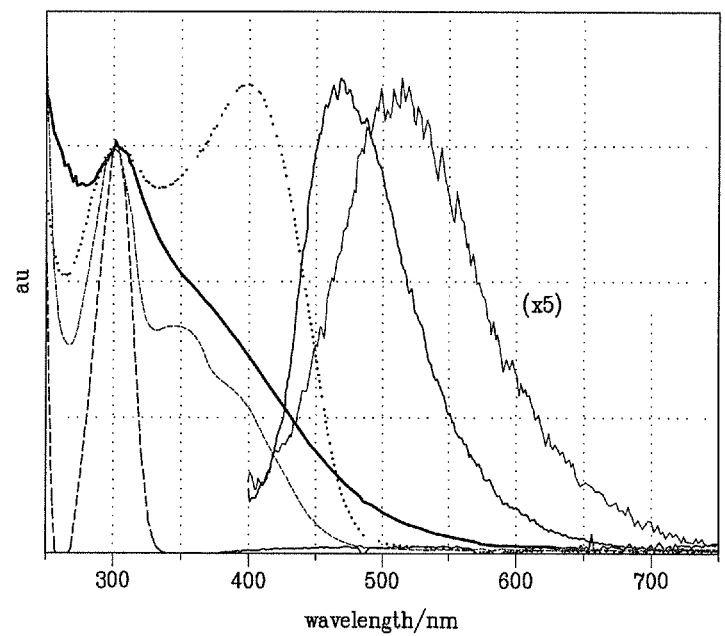
FIG. 6 illustrates absorption and emission spectra of reaction product obtained by the procedure a in Scheme 2 from DMF/$H_2O$ (10:1, solid line), EtOH/$H_2O$ (10:1, dashed line), and $H_2O$ (dotted line) solvent systems. Dot and dashed lines indicate absorption spectra of the monomeric {[2,5-diiodo-1, 4-bis(3-propoxy-sulfonic acid)benzene]sodium salt} compound. Absorption spectra were normalized at the absorption maxima of monomeric unit (302 nm), and the emission spectrum of the product obtained from H₂O solvent was multiplied by 5 times. All spectra were measured in H2O at 296±K, λex=390 nm for fluorescence spectra.

FIG. 6 depicts the absorption and emission spectra of reaction product obtained by the procedure a in Scheme 2 in the text from DMF/$H_2O$ (10:1, solid line), EtOH/$H_2O$ (10:1, dashed line), and $H_2O$ (dotted line) solvent systems. Dot and dashed lines indicate absorption spectra of the monomeric {[2,5-diiodo-1,4-bis(3-propoxy-sulfonic acid)benzene]sodium salt} compound. Absorption spectra were normalized at the absorption maxima of monomeric unit (302 nm). Note that the emission spectrum of the product obtained from $H_2O$ solvent is multiplied 5 fold. All spectra were measured in $H_2O$ at 296±1 K. $\lambda_{ex}$=390 nm for fluorescence spectra.

FIG. 10 illustrates absorption and emission spectra of PPES obtained via the synthetic procedure outlined in Scheme 2, protocol b. The solvent was deionized $H_2O$, T=296 K, $\lambda_{ex}$=390 nm, and fluorescence quantum yield ($\Phi_f$)=0.064;

Sample Batch: {[2,5-Diiodo-1,4-bis(3-propoxy-sulfonic acid)benzene]sodium salt}=100 mg (154 µmol), 1,2-Bis(4',4',5',5'-tetramethyl[1',3',2']dioxaborolan-2'-yl)ethyne=55 mg (197 µmol), Pd(OAc)$_2$=0.5 mg (2.2 µmole), tri(4,6-dimethyl-3-sulfonatophenyl)phosphine trisodium (TXPTS)=5 mg (7.6 µmole), 1.5 M NaOH solution=0.8 mL, Reaction temperature=150° C., Reaction time=90 min. Isolated yield=59 mg (91% based on 154 µmol {[2,5-diiodo-1,4-bis(3-propoxy-sulfonic acid)benzene]sodium salt}. $^1$H NMR (500 MHz, $D_2O$/DMSO (~10:1 v:v)): δ 7.4-6.9 (m, 2H), 4.3-4.1 (m, 4H), 3.2-2.8 (m, 4 H), 2.3-2.1 (m, 4H) $^{13}$C NMR (500 MHz, $D_2O$/DMSO (~10:1 v:v)): δ 155-154 (m), 120-112 (m), 94-92 (m), 70-69 (m), 49 (m), 26 (m). GPC($H_2O$, 25° C.): Mw=18832, Mn=17553, PDI (Mw/Mn)=1.07. V is ($H_2O$): 407 nm; $\lambda_{em}$ ($H_2O$): 485 nm Fluorescence Quantum Yield: 0.064.

General procedure of PPES synthesis under air: The procedure was exactly as same as that described above, except that an inert atmosphere and degassing of the NaOH solution were not employed.

Sample: {[2,5-Diiodo-1,4-bis(3-propoxy-sulfonic acid) benzene]sodium salt}=180 mg (277 µmol), 1,2-Bis(4',4',5',5'-tetramethyl[1',3',2']dioxaborolan-2'-yl)ethyne=90 mg (324 µmol), Pd(OAc)$_2$=1 mg (4.5 µmole), tri(4,6-dimethyl-3-sulfonatophenyl)phosphine trisodium (TXPTS)=10 mg (15 µmole), 1 M NaOH solution=2 mL, Reaction temperature=150° C., Reaction time=10 min µmole. Isolated yield=55 mg (85% based on 154 µmol {[2,5-diiodo-1,4-bis(3-propoxy-sulfonic acid)benzene]sodium salt}. Mw=8486, Mn=8317, PDI (Mw/Mn)=1.02.

Figure 11:
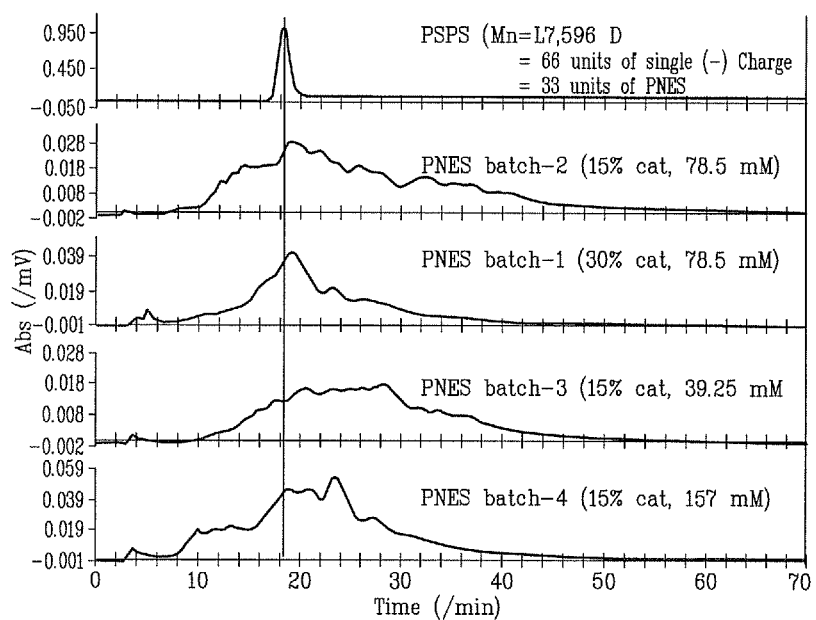
FIG. 11 illustrates anion exchange chromatography of poly (1,5-napthaleneethynylene) (PNES) (batches 1-4 with respect to a PSPS standard (Mn=17596 D≈66 unit of PSPS≈33 units of PNES), the samples were eluted using a salt gradient of 0-to-1M of NaSCN in 20 mM MES buffer (in 10% DMF:H₂O mixture) over a 60 minute duration at a flow rate of 2 mL/min.

Anion exchange chromatography of exemplary PNES batches with respect to a PSPS standard ($M_n$=17596 D≈66 unit of PSPS≈33 units of PNES) is shown in FIG. 11. These samples were eluted using a salt gradient of 0-to-1M of NaSCN in 20 mM MES buffer (in 10% DMF:$H_2O$ mixture) over a 60 minute duration at a flow rate of 2 mL/min X-ray Structure Determination of 1,2-Bis(4',4',5',5'-tetramethyl[1',3',2]dioxaborolan-2'-yl)ethyne.

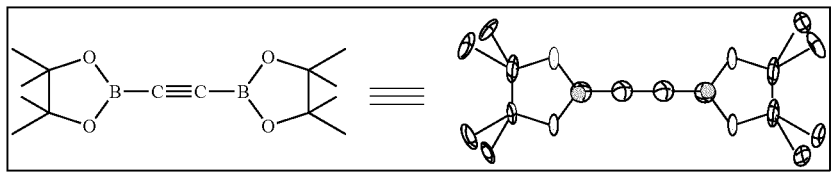

1,2-Bis(4',4',5',5'-tetramethyl[1',3',2']dioxaborolan-2'-yl) ethyne, $C_{14}B_2H_{24}O_4$, crystallizes in the triclinic space group PT with a=11.980(2)Å, b=12.267(2)Å, c=12.515(2)Å, $\alpha$=88.469(6)°, $\beta$=88.440(6)°, $\gamma$=62.600(4)°, V=1632.1(3) Å$^3$, Z=4 and $d_{calc}$=1.131 g/cm$^3$. X-ray intensity data were collected on a Rigaku Mercury CCD area detector employing graphite-monochromated Mo—K$_\alpha$ radiation ($\lambda$=0.71069 Å) at a temperature of 143 K. Indexing was performed from a series of four 0.5° oscillation images with exposures of 30 seconds per frame. A hemisphere of data was collected using 60 second exposures and a crystal-to-detector distance of 50 mm. A total of 440 images were collected: one sweep was performed using $\phi$-scans from -90° to +90° in 0.5° steps at $\omega$=0° and $\chi$=0° with a detector swing angle of -15°; a second sweep was done using $\omega$-scans from -20° to +20° in 0.5° steps at $\chi$=-90° and $\phi$=0° with a detector swing angle of -15°. Oscillation images were processed using CrystalClear™ (Rigaku Corp.), producing a listing of unaveraged F$^2$ and $\sigma$(F$^2$) values which were then passed to the teXsan™ (Crystal Structure Analysis Package, Molecular Structure Corporation) program package for further processing and structure solution on a Silicon Graphics O2 computer. During the process of structure determination, it became obvious that there were problems with the data: refinement of the structure was unstable and anisotropic refinement produced several non-positive definite thermal parameters. A re-examination of the rotation images revealed many reflections that didn't fit the derived cell. The crystal was found to be twinned with a total of four components (components 1 & 2 were related by a rotation of 180° around the normal to 110; components 1 & 3 were related by a rotation of 180° around the normal to 00T; components 1 & 4 were related by a rotation of 180° around the normal to 1T0). Twin indexing and processing of twinned data was performed by the TwinSolve$^7$ module of Crystal-Clear. A total of 11057 reflections were measured over the ranges 5.02 $\leq 2\theta \leq$ 50.08°, -14$\leq$h$\leq$14, -14$\leq$k$\leq$14, -14$\leq$l $\leq$14. The intensity data were corrected for Lorentz and polarization effects but not for absorption.

The structure was solved by direct methods (SIR92; Altomare, A., Burla, M. C., Camalli, M., Cascarano, M., Giacovazzo, C., Guagliardi, A., Polidoro, G. J. Appl. Cryst. 1994, 27, 435). Refinement was by full-matrix least squares based on F$^2$ using SHELXL-93 (Program for the Refinement of Crystal Structures, Sheldrick, G. M. 1993, University of Göttingen, Germany). All reflections were used during refinement (F$^2$'s that were experimentally negative were replaced by F$^2$=0). The weighting scheme used was w=1/[$\sigma^2$ (F$_o^2$) 0.1066P$^2$+1.1434P] where P=(F$_o^2$+2F$_c^2$)/3. Non-hydrogen atoms were refined anisotropically and hydrogen atoms were refined using a "riding" model. Refinement converged to $R_1$=0.0717 and $wR_2$=0.2139 for 10307 reflections for which F>4$\sigma$(F) and $R_1$=0.0763, $wR_2$=0.2204 and GOF=1.190 for all 11057 unique, non-zero reflections and 364 variables.

The maximum $\Delta/\sigma$ in the final cycle of least squares was 0.000 and the two most prominent peaks in the final difference Fourier were +0.378 and -0.259 e/Å$^3$.

Table 1. lists cell information, data collection parameters, and refinement data. Final positional and equivalent isotropic thermal parameters are given in Table 2. Anisotropic thermal parameters are in Table 3. Tables 4 and 5 list bond distances and bond angles. FIGS. 7 and 8 are ORTEP (A Fortran Thermal Ellipsoid Plot Program for Crystal Structure Illustrations". C. K. Johnson 1976, ORNL-5138) representations of the molecule with 30% probability thermal ellipsoids displayed. ($R_1 = \Sigma \|F_o|-|F_c\|/\Sigma|F_o|$; $wR_2 = \{\Sigma w(F_o^2-F_c^2)^2/\Sigma w (F_o^2)^2\}^{1/2}$; $GOF=\{\Sigma w(F_o^2-F_c^2)^2/(n-p)\}^{1/2}$, where n=the number of reflections and p=the number of parameters refined.)

TABLE 1

Summary of Structure Determination of 1,2-Bis(4',4',5',5'-tetramethyl[1',3',2']dioxaborolan-2'-yl)ethyne.

| | |
|---|---|
| Formula: | $C_{14}B_2H_{24}O_4$ |
| Formula weight: | 277.95 |
| Crystal class: | triclinic |
| Space group: | PT (#2) |
| Z | 4 |
| Cell constants: | |
| a | 11.980(2)Å |
| b | 12.267(2)Å |
| c | 12.515(2)Å |
| $\alpha$ | 88.469(6)° |
| $\beta$ | 88.440(6)° |
| $\gamma$ | 62.600(4)° |
| V | 1632.1(3)Å$^3$ |
| $\mu$ | 0.78 cm$^{-1}$ |
| crystal size, mm | 0.42 × 0.26 × 0.24 |
| $D_3$ | 1.131 g/cm$^3$ |
| F(000) | 600 |
| Radiation: | Mo—K$\alpha$ ($\lambda$ = 0.71069Å) |
| 2$\theta$ range | 5.02-50.08° |
| hkl collected: | -14 $\leq$ h $\leq$ 14; -14 $\leq$ k $\leq$ 14; -14 $\leq$ l $\leq$ 14 |
| No. reflections measured: | 11057 |
| No. observed reflections | 10307 (F > 4$\sigma$) |
| No. reflections used in refinement | 11057 |
| No. parameters | 364 |
| R indices (F > 4$\sigma$) | $R_1$ = 0.0717 |
| | $wR_2$ = 0.2139 |
| R indices (all data) | $R_1$ = 0.0763 |
| | $wR_2$ = 0.2204 |
| GOF: | 1.190 |
| Final Difference Peaks, e/Å$^3$ | +0.378, -0.259 |

TABLE 2

Refined Positional Parameters 22/30

| Atom | x | y | z | $U_{eq}$, Å$^2$ |
|---|---|---|---|---|
| B1 | 0.1315 (3) | 1.1010 (3) | 1.0003 (2) | 0.0245 (7) |
| B2 | 0.3694 (3) | 0.8608 (3) | 0.7555 (2) | 0.0241 (7) |
| C1 | -0.0131 (3) | 1.2723 (3) | 1.0796 (2) | 0.0314 (7) |
| C2 | 0.0480 (3) | 1.1692 (3) | 1.1632 (2) | 0.0284 (7) |
| C3 | -0.1409 (3) | 1.2901 (3) | 1.0437 (2) | 0.0461 (9) |
| H3a | -0.1352 (3) | 1.2120 (3) | 1.0261 (2) | 0.069 |
| H3b | -0.1663 (3) | 1.3435 (3) | 0.9820 (2) | 0.069 |

TABLE 2-continued

Refined Positional Parameters 22/30

| Atom | x | y | z | $U_{eq}$, Å2 |
|---|---|---|---|---|
| H3c | −0.2016 (3) | 1.3259 (3) | 1.1005 (2) | 0.069 |
| C4 | −0.0190 (3) | 1.3949 (3) | 1.1081 (2) | 0.0445 (9) |
| H4a | 0.0623 (3) | 1.3818 (3) | 1.1304 (2) | 0.067 |
| H4b | −0.0792 (3) | 1.4313 (3) | 1.1651 (2) | 0.067 |
| H4c | −0.0438 (3) | 1.4488 (3) | 1.0466 (2) | 0.067 |
| C5 | 0.1496 (3) | 1.1784 (3) | 1.2270 (2) | 0.0441 (9) |
| H5a | 0.2067 (3) | 1.1907 (3) | 1.1789 (2) | 0.066 |
| H5b | 0.1947 (3) | 1.1039 (3) | 1.2676 (2) | 0.066 |
| H5c | 0.1114 (3) | 1.2464 (3) | 1.2747 (2) | 0.066 |
| C6 | −0.0432 (3) | 1.1497 (3) | 1.2380 (2) | 0.0372 (8) |
| H6a | −0.1069 (3) | 1.1441 (3) | 1.1970 (2) | 0.056 |
| H6b | −0.0819 (3) | 1.2176 (3) | 1.2858 (2) | 0.056 |
| H6c | 0.0014 (3) | 1.0751 (3) | 1.2787 (2) | 0.056 |
| C7 | 0.2174 (3) | 1.0139 (3) | 0.9120 (2) | 0.0270 (7) |
| C8 | 0.4341 (3) | 0.7757 (3) | 0.5942 (2) | 0.0347 (8) |
| C9 | 0.5386 (3) | 0.7118 (3) | 0.6744 (2) | 0.0341 (8) |
| C10 | 0.6679 (3) | 0.6964 (3) | 0.6392 (2) | 0.0422 (8) |
| H10a | 0.7271 (3) | 0.6553 (3) | 0.6949 (2) | 0.063 |
| H10b | 0.6633 (3) | 0.7756 (3) | 0.6250 (2) | 0.063 |
| H10c | 0.6948 (3) | 0.6484 (3) | 0.5755 (2) | 0.063 |
| C11 | 0.5469 (4) | 0.5891 (3) | 0.7160 (2) | 0.0505 (10) |
| H11a | 0.6139 (4) | 0.5522 (3) | 0.7662 (2) | 0.076 |
| H11b | 0.5631 (4) | 0.5349 (3) | 0.6571 (2) | 0.076 |
| H11c | 0.4689 (4) | 0.6036 (3) | 0.7506 (2) | 0.076 |
| C12 | 0.4533 (3) | 0.8705 (3) | 0.5242 (2) | 0.0437 (9) |
| H12a | 0.3853 (3) | 0.9083 (3) | 0.4750 (2) | 0.066 |
| H12b | 0.5314 (3) | 0.8303 (3) | 0.4851 (2) | 0.066 |
| H12c | 0.4552 (3) | 0.9321 (3) | 0.5687 (2) | 0.066 |
| C13 | 0.4056 (3) | 0.6917 (3) | 0.5246 (2) | 0.0459 (9) |
| H13a | 0.3386 (3) | 0.7406 (3) | 0.4770 (2) | 0.069 |
| H13b | 0.3807 (3) | 0.6415 (3) | 0.5692 (2) | 0.069 |
| H13c | 0.4794 (3) | 0.6402 (3) | 0.4837 (2) | 8.059 |
| C14 | 0.2834 (3) | 0.9479 (3) | 0.8437 (2) | 0.0260 (7) |
| O1 | 0.0735 (2) | 1.2243 (3) | 0.98651 (13) | 0.0352 (6) |
| O2 | 0.1121 (2) | 1.0598 (3) | 1.09596 (13) | 0.0327 (5) |
| O3 | 0.3235 (2) | 0.8446 (3) | 0.66309 (14) | 0.0386 (6) |
| O4 | 0.4943 (2) | 0.7972 (3) | 0.76499 (14) | 0.0353 (6) |
| B3 | 0.3488 (3) | 0.3832 (3) | 0.7480 (2) | 0.0252 (7) |
| B4 | 0.1117 (3) | 0.6218 (3) | 0.5035 (2) | 0.0258 (7) |
| C15 | 0.4433 (3) | 0.3136 (3) | 0.9068 (2) | 0.0338 (8) |
| C16 | 0.4973 (3) | 0.2101 (3) | 0.8249 (2) | 0.0313 (7) |
| C17 | 0.3462 (3) | 0.3066 (4) | 0.9831 (2) | 0.0591 (12) |
| H17a | 0.2852 (3) | 0.2950 (4) | 0.9433 (2) | 0.089 |
| H17b | 0.3050 (3) | 0.3816 (4) | 1.0222 (2) | 0.089 |
| H17c | 0.3870 (3) | 0.2388 (4) | 1.0321 (2) | 0.089 |
| C18 | 0.5413 (3) | 0.3320 (3) | 0.9687 (2) | 0.0475 (9) |
| H18a | 0.6022 (3) | 0.3363 (3) | 0.9196 (2) | 0.071 |
| H18b | 0.5827 (3) | 0.2643 (3) | 1.0177 (2) | 0.071 |
| H18c | 0.5007 (3) | 0.4070 (3) | 1.0078 (2) | 0.071 |
| C19 | 0.5047 (3) | 0.0891 (3) | 0.8618 (3) | 0.0527 (10) |
| H19a | 0.4249 (3) | 0.1024 (3) | 0.8919 (3) | 0.079 |
| H19b | 0.5683 (3) | 0.0524 (3) | 0.9149 (3) | 0.079 |
| H19c | 0.5255 (3) | 0.0353 (3) | 0.8020 (3) | 0.079 |
| C20 | 0.6234 (3) | 0.1904 (3) | 0.7769 (2) | 0.0456 (9) |
| H20a | 0.6178 (3) | 0.2679 (3) | 0.7536 (2) | 0.068 |
| H20b | 0.6445 (3) | 0.1369 (3) | 0.7169 (2) | 0.068 |
| H20c | 0.6873 (3) | 0.1539 (3) | 0.8298 (2) | 0.068 |
| C21 | 0.2624 (3) | 0.4706 (2) | 0.6608 (2) | 0.0272 (7) |
| C22 | −0.0564 (3) | 0.7751 (2) | 0.4229 (2) | 0.0246 (6) |
| C23 | 0.0508 (3) | 0.7076 (3) | 0.3396 (2) | 0.0266 (7) |
| C24 | −0.0620 (3) | 0.8947 (3) | 0.4603 (2) | 0.0360 (8) |
| H24a | 0.0206 (3) | 0.8806 (3) | 0.4798 (2) | 0.054 |
| H24b | −0.1178 (3) | 0.9238 (3) | 0.5211 (2) | 0.054 |
| H24c | −0.0922 (3) | 0.9549 (3) | 0.4035 (2) | 0.054 |
| C25 | −0.1848 (3) | 0.7933 (3) | 0.3914 (2) | 0.0391 (8) |
| H25a | −0.1787 (3) | 0.7167 (3) | 0.3682 (2) | 0.059 |
| H25b | −0.2159 (3) | 0.8529 (3) | 0.3342 (2) | 0.059 |
| H25c | −0.2415 (3) | 0.8218 (3) | 0.4518 (2) | 0.059 |
| C26 | 0.0823 (3) | 0.7908 (3) | 0.2678 (2) | 0.0387 (8) |
| H26a | 0.0949 (3) | 0.8479 (3) | 0.3105 (2) | .058 |
| H26b | 0.0144 (3) | 0.8350 (3) | 0.2197 (2) | 0.058 |
| H26c | 0.1578 (3) | 0.7423 (3) | 0.2274 (2) | 0.058 |
| C27 | 0.0303 (3) | 0.6156 (3) | 0.2742 (2) | 0.0409 (8) |
| H27a | 0.0104 (3) | 0.5637 (3) | 0.3214 (2) | 0.061 |
| H27b | 0.1054 (3) | 0.5663 (3) | 0.2339 (2) | 0.061 |
| H27c | −0.0379 (3) | 0.6589 (3) | 0.2262 (2) | 0.061 |
| C28 | 0.1955 (3) | 0.5374 (3) | 0.5926 (2) | 0.0279 (7) |
| O5 | 0.3759 (2) | 0.4233 (2) | 0.83844 (14) | 0.0372 (6) |
| O6 | 0.4060 (2) | 0.2597 (2) | 0.73794 (14) | 0.0358 (5) |
| O7 | −0.0145 (2) | 0.6893 (2) | 0.51580 (13) | 0.0291 (5) |
| O8 | 0.1593 (2) | 0.6357 (2) | 0.40743 (13) | 0.0287 (5) |

$U_{eq} = \frac{1}{3}[U_{11}(aa^*)^2 + U_{22}(bb^*)^2 + U_{33}(cc^*)^2 + 2U_{12}aa^*bb^*\cos\square + 2U_{13}aa^*cc^*\cos\square + 2U_{23}bb^*cc^*\cos\square]$

TABLE 3

Refined Thermal Parameters (U's)

| Atom | $U_{11}$ | $U_{22}$ | $U_{33}$ | $U_{23}$ | $U_{13}$ | $U_{12}$ |
|---|---|---|---|---|---|---|
| B1 | 0.018 (2) | 0.029 (2) | 0.021 (2) | −0.0040 (14) | −0.0016 (13) | −0.006 (2) |
| B2 | 0.021 (2) | 0.025 (2) | 0.0187 (14) | −0.0001 (13) | 0.0030 (13) | −0.005 (2) |
| C1 | 0.032 (2) | 0.027 (2) | 0.0266 (14) | −0.0076 (12) | 0.0134 (13) | −0.007 (2) |
| C2 | 0.030 (2) | 0.025 (2) | 0.0273 (14) | −0.0102 (12) | 0.0092 (12) | −0.0095 (14) |
| C3 | 0.025 (2) | 0.052 (2) | 0.043 (2) | −0.010 (2) | −0.0021 (14) | −0.001 (2) |
| C4 | 0.057 (2) | 0.024 (2) | 0.046 (2) | −0.0091 (14) | 0.022 (2) | −0.014 (2) |
| C5 | 0.036 (2) | 0.062 (2) | 0.032 (2) | −0.013 (2) | 0.0006 (14) | −0.020 (2) |
| C6 | 0.051 (2) | 0.041 (2) | 0.0261 (14) | −0.0047 (13) | 0.0102 (14) | −0.026 (2) |
| C7 | 0.025 (2) | 0.026 (2) | 0.0253 (14) | −0.0013 (13) | −0.0021 (13) | −0.0083 (14) |
| C8 | 0.026 (2) | 0.042 (2) | 0.031 (2) | −0.0147 (14) | 0.0108 (13) | −0.011 (2) |
| C9 | 0.032 (2) | 0.033 (2) | 0.029 (2) | −0.0148 (13) | 0.0078 (13) | −0.008 (2) |
| C10 | 0.028 (2) | 0.050 (2) | 0.045 (2) | −0.016 (2) | 0.0090 (14) | −0.014 (2) |
| C11 | 0.065 (2) | 0.028 (2) | 0.044 (2) | 0.0032 (14) | 0.010 (2) | −0.009 (2) |
| C12 | 0.054 (2) | 0.036 (2) | 0.031 (2) | −0.0023 (14) | 0.014 (2) | −0.013 (2) |
| C13 | 0.047 (2) | 0.062 (2) | 0.037 (2) | −0.022 (2) | 0.008 (2) | −0.032 (2) |
| C14 | 0.023 (2) | 0.025 (2) | 0.0237 (13) | −0.0005 (12) | −0.0015 (13) | −0.0059 (13) |
| O1 | 0.0441 (13) | 0.0272 (12) | 0.0249 (10) | −0.0046 (8) | 0.0142 (9) | −0.0088 (10) |
| O2 | 0.0415 (13) | 0.0229 (10) | 0.0247 (10) | −0.0064 (8) | 0.0091 (9) | −0.0074 (10) |
| O3 | 0.0247 (11) | 0.0557 (14) | 0.0290 (10) | −0.0173 (10) | 0.0079 (9) | −0.0125 (11) |
| O4 | 0.0230 (12) | 0.0430 (13) | 0.0285 (10) | −0.0184 (9) | 0.0022 (9) | −0.0046 (10) |
| B3 | 0.016 (2) | 0.030 (2) | 0.023 (2) | 0.0033 (13) | −0.0007 (13) | −0.005 (2) |
| B4 | 0.028 (2) | 0.023 (2) | 0.025 (2) | −0.0027 (13) | −0.0045 (14) | −0.040 (2) |
| C15 | 0.035 (2) | 0.031 (2) | 0.0273 (14) | 0.0134 (13) | −0.0148 (13) | −0.008 (2) |
| C16 | 0.029 (2) | 0.026 (2) | 0.034 (2) | 0.0117 (13) | −0.0157 (13) | −0.008 (2) |
| C17 | 0.044 (2) | 0.084 (3) | 0.036 (2) | 0.021 (2) | 0.000 (2) | −0.020 (2) |

TABLE 3-continued

Refined Thermal Parameters (U's)

| Atom | $U_{11}$ | $U_{22}$ | $U_{33}$ | $U_{23}$ | $U_{13}$ | $U_{12}$ |
|---|---|---|---|---|---|---|
| C18 | 0.056 (2) | 0.041 (2) | 0.041 (2) | 0.005 (2) | −0.021 (2) | −0.017 (2) |
| C19 | 0.053 (2) | 0.036 (2) | 0.069 (2) | 0.018 (2) | −0.025 (2) | −0.020 (2) |
| C20 | 0.031 (2) | 0.046 (2) | 0.044 (2) | 0.009 (2) | −0.004 (2) | −0.004 (2) |
| C21 | 0.027 (2) | 0.025 (2) | 0.0225 (13) | 0.0002 (12) | −0.0011 (13) | −0.0058 (14) |
| C22 | 0.022 (2) | 0.019 (2) | 0.0261 (14) | 0.0081 (11) | −0.0056 (12) | −0.0044 (13) |
| C23 | 0.025 (2) | 0.028 (2) | 0.0215 (13) | 0.0060 (12) | −0.0070 (12) | −0.0077 (14) |
| C24 | 0.041 (2) | 0.026 (2) | 0.033 (2) | −0.0031 (13) | −0.0036 (14) | −0.008 (2) |
| C25 | 0.022 (2) | 0.039 (2) | 0.051 (2) | 0.011 (2) | −0.0102 (14) | −0.008 (2) |
| C26 | 0.039 (2) | 0.049 (2) | 0.031 (2) | 0.0122 (14) | −0.0030 (14) | −0.022 (2) |
| C27 | 0.049 (2) | 0.038 (2) | 0.031 (2) | −0.0054 (14) | −0.008 (2) | −0.015 (2) |
| C28 | 0.026 (2) | 0.025 (2) | 0.0250 (14) | −0.0030 (13) | 0.0032 (13) | −0.0051 (14) |
| O5 | 0.0435 (13) | 0.0254 (11) | 0.0290 (10) | 0.0045 (9) | −0.0128 (9) | −0.0038 (10) |
| O6 | 0.0384 (13) | 0.0265 (11) | 0.0353 (10) | 0.0064 (9) | −0.0196 (9) | −0.0082 (10) |
| O7 | 0.0233 (11) | 0.0278 (11) | 0.0247 (9) | 0.0075 (8) | −0.0017 (8) | −0.0024 (9) |
| O8 | 0.0207 (10) | 0.0327 (11) | 0.0219 (9) | 0.0057 (8) | −0.0038 (8) | −0.0031 (9) |

The form of the anisotropic displacement parameter is:
$\exp[-2\pi^2(a^{*2}U_{11}h^2 + b^{*2}U_{22}k^2 + c^{*2}U_{33}l^2 + 2b^*c^*U_{23}kl + 2a^*c^*U_{13}hl + 2a^*b^*U_{12}hk)]$.

TABLE 4

Bond Distances, Å

| B1-O2 | 1.344 (4) | B1-O1 | 1.351 (4) | B1-C7 | 1.553 (4) |
|---|---|---|---|---|---|
| B2-O4 | 1.339 (4) | B2-O3 | 1.352 (4) | B2-C14 | 1.553 (4) |
| C1-O1 | 1.479 (3) | C1-C3 | 1.522 (4) | C1-C4 | 1.524 (4) |
| C1-C2 | 1.534 (4) | C2-O2 | 1.476 (3) | C2-C6 | 1.517 (4) |
| C2-C5 | 1.521 (4) | C7-C14 | 1.192 (3) | C8-O3 | 1.469 (3) |
| C8-C9 | 1.520 (4) | C8-C13 | 1.526 (4) | C8-C12 | 1.534 (4) |
| C9-O4 | 1.478 (3) | C9-C10 | 1.526 (4) | C9-C11 | 1.540 (5) |
| B3-O5 | 1.351 (4) | B3-O6 | 1.353 (4) | B3-C21 | 1.546 (4) |
| B4-O7 | 1.355 (4) | B4-O8 | 1.356 (4) | B4-C28 | 1.539 (4) |
| C15-O5 | 1.474 (4) | C15-C17 | 1.516 (5) | C15-C18 | 1.528 (5) |
| C15-C16 | 1.535 (4) | C16-O6 | 1.473 (4) | C16-C19 | 1.507 (4) |
| C16-C20 | 1.525 (5) | C21-C28 | 1.199 (4) | C22-O7 | 1.480 (3) |
| C22-C25 | 1.512 (4) | C22-C24 | 1.522 (4) | C22-C23 | 1.555 (4) |
| C23-O8 | 1.467 (3) | C23-C26 | 1.510 (4) | C23-C27 | 1.522 (4) |

TABLE 5

Bond Angles, °

| O2-B1-O1 | 115.5 (2) | O2-B1-C7 | 122.6 (3) | O1-B1-C7 | 121.9 (2) |
|---|---|---|---|---|---|
| O4-B2-O3 | 115.2 (2) | O4-B2-C14 | 122.5 (2) | O3-B2-C14 | 122.3 (2) |
| O1-C1-C3 | 106.5 (2) | O1-C1-C4 | 107.5 (2) | C3-C1-C4 | 110.7 (3) |
| O1-C1-C2 | 102.4 (2) | C3-C1-C2 | 113.5 (3) | C4-C1-C2 | 115.3 (2) |
| O2-C2-C6 | 108.2 (2) | O2-C2-O5 | 106.6 (2) | C6-C2-O5 | 110.2 (2) |
| O2-C2-C1 | 102.1 (2) | C6-C2-C1 | 115.1 (2) | C5-C2-C1 | 113.8 (3) |
| C14-C7-B1 | 179.4 (3) | O3-C8-C9 | 102.8 (2) | O3-C8-C13 | 108.0 (3) |
| C9-C8-C13 | 115.9 (3) | O3-C8-C12 | 106.9 (2) | C9-C8-C12 | 112.4 (3) |
| C13-C8-C12 | 110.1 (2) | O4-C9-C8 | 102.2 (2) | O4-C9-C10 | 107.9 (3) |
| C8-C9-C10 | 115.8 (3) | O4-C9-C11 | 106.9 (2) | C8-C9-C11 | 112.4 (3) |
| C10-C9-C11 | 110.9 (2) | C7-C14-B2 | 179.4( 3) | B1-O1-C1 | 105.3 (2) |
| B1-O2-C2 | 105.9 (2) | B2-O3-C8 | 105.4 (2) | B2-O4-C9 | 105.8 (2) |
| O5-B3-O6 | 114.7 (2) | O5-B3-C21 | 123.1 (3) | O6-B3-C21 | 122.1 (3) |
| O7-B4-O8 | 115.2 (2) | O7-B4-C28 | 122.5 (3) | O8-B4-C28 | 122.3 (3) |
| O5-C15-C17 | 106.6 (2) | O5-C15-C18 | 107.7 (3) | C17-C15-C18 | 110.3 (3) |
| O5-C15-C16 | 102.3 (2) | C17-C15-C16 | 114.1 (3) | C18-C15-C16 | 115.0 (2) |
| O6-C16-C19 | 108.3 (3) | O6-C16-C20 | 106.3 (2) | C19-C16-C20 | 110.1 (3) |
| O6-C16-C15 | 102.4 (2) | C19-C16-C15 | 115.8 (2) | C20-C16-C15 | 113.2 (3) |
| C28-C21-B3 | 179.4 (3) | O7-C22-C25 | 108.3 (2) | O7-C22-C24 | 106.1 (2) |
| C25-C22-C24 | 111.2 (2) | O7-C22-C23 | 102.0 (2) | C25-C22-C23 | 115.1 (2) |
| C24-C22-C23 | 113.1 (3) | O8-C23-C26 | 108.3 (2) | O8-C23-C27 | 106.5 (2) |
| C26-C23-C27 | 110.8 (2) | O8-C23-C22 | 102.6 (2) | C26-C23-C22 | 114.8 (2) |
| C27-C23-C22 | 113.1 (3) | C21-C28-B4 | 178.9 (3) | B3-O5-C15 | 106.1 (2) |
| B3-O6-C16 | 106.1 (2) | B4-O7-C22 | 105.9 (2) | B4-O8-C23 | 106.2 (2) |

Supporting Information—PNES

Materials. All manipulations were carried out under nitrogen prepurified by passage through an $O_2$ scrubbing tower (Schweizerhall R3-11 catalyst) and a drying tower (Linde 3-Å molecular sieves) unless otherwise noted. Standard Schlenk techniques were employed to manipulate air sensitive solutions. All solvents utilized in this work were obtained from Fisher Scientific (HPLC grade). The catalyst, $Pd(OAc)_2$, were obtained from Aldrich, tri(4,6-dimethyl-3-sulfonatophenyl)phosphine trisodium (TXPTS) were obtained from Strem. Sodium hydroxide was obtained from Fisher Scientific. 1,5-hydroxynapthanol was obtained from Aldrich and used as precursor for 2,6-Diiodo-1,5-hydroxynapthanol from which {[2,6-diiodo-1,5-bis(3-propoxy-sulfonic acid)napthalene]sodium salt} was synthesized reacting with 1,3-Propane Sultone (from Aldrich) according to the procedure published in the literature. Zhou, Q.; Swager, T. M. J. Amer. Chem. Soc. 1995, 117, 12593-12602; Tan, C. Y.; Pinto, M. R.; Schanze, K. S. Chem. Commun 2002, 446-447. Chromatographic purification (Bio-Gel) P-4 Gel 90-180 mm, Bio-Rad Laboratories) of polymer compounds was performed on the bench top.

Instrumentation. Electronic spectra were recorded on an OLIS UV/vis/NIR spectrophotometry system that is based on the optics of a Cary 14 spectrophotometer. Emission spectra were recorded on a SPEX Fluorolog luminescence spectrophotometer that utilized a T-channel configuration with a red sensitive R2658 Hamamatsu PMT detector: these spectra were corrected for variations in photomultiplier response over wavelength using correction curves generated from the spectral output of a calibrated light source supplied by the National Bureau of Standards. All spectroscopic measurements were carried out at 23±1° C. The fluorescence quantum yield was determined using quinine sulfate ($F_f$=0.546 in 1.0 N $H_2SO_4$, $OD_{350}$=0.015) as a standard.[3] All solutions were purged with Argon prior to measurements. Solutions of $OD(l_{max})$ ~1.0 (76 mg/L) and $OD(l_{max})$ ~0.015 were used for UV-visible absorption and fluorescence measurements, respectively. NMR spectra were recorded on a 500 MHz AC-Bruker spectrometer. Chemical shifts for $^1H$ NMR spectra are relative to residual protium in the deuterated solvents ($D_2O$=4.75 ppm, DMSO-$d_6$=2.54 ppm). The molecular weights of polymers were determined by anion exchange chromatography using a Varian Prostar HPLC system equipped with an anion exchange column (NS1500; 75×7.6 mm; Biochrom Labs) and a Varian UV-Vis detector. Polymeric materials were eluted with a salt gradient (0 to 1 M NaSCN in 60 min dissolved in 20 mM MES buffer) in 10% DMF-$H_2O$ mixture at a flow rate of 2.0 mL/min. Molecular weights are reported relative to poly[4-(3-propoxysulfonicacidsodiumsalt)styrene] (PSPS) standard[1,2] (Mn=17,596≈66 units). Microwave assisted reactions were performed with Emrys Personal Chemistry System (Biotage).

Synthesis

General Procedure of PNES Synthesis Under Inert Atmosphere (Scheme 3):

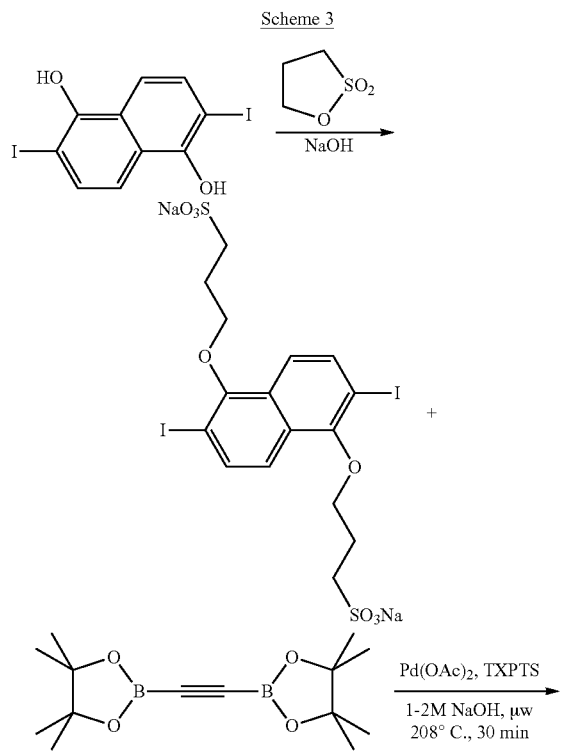

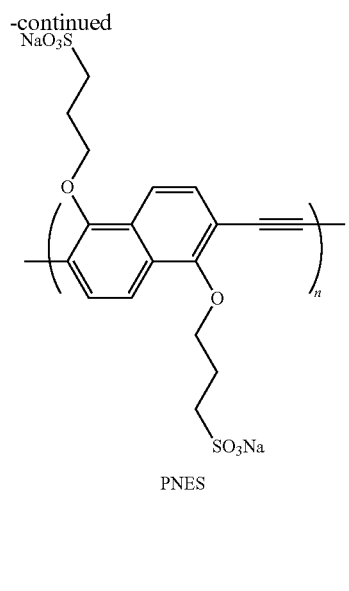

A 5 mL microwave vial (Biotage) was charged with {[2,5-diiodo-1,4-bis(3-propoxy-sulfonic acid)napthalene]sodium salt}, 1,2-bis(4',4',5',5'-tetramethyl[1',3',2']dioxaborolan-2'-yl)ethyne, Pd(OAc)$_2$, tri(4,6-dimethyl-3-sulfonatophenyl) phosphine trisodium (TXPTS),[4] and a magnetic stir bar. After sealing with a vial cap, this vessel was subject to vacuum and charged with argon. The vacuuming/charging cycle was repeated 3 times. An aqueous 1 M NaOH solution, previously degassed with argon for 1 h, was added via syringe. The vessel was placed into the microwave cavity. The reaction mixture was stirred at room temperature for 1 min and then microwave irradiated at 30 W. The temperature was ramped from room temperature to the set point. Once the set temperature was reached, the reaction mixture was held at that temperature for a designated time period. After the mixture was allowed to cool to room temperature, the reaction vessel was opened. The resulting solution was viscous, greenish brown in color and exhibited an intense yellowish green fluorescence when illuminated with a 365 nm UV lamp. This solution was diluted with deionized water and then filtered through a glass frit and filter paper, successively. The filtrate was concentrated to about 3 mL, and loaded on the top of the size exclusion column (2×50 cm) packed with Bio-Gel® P-4 Gel (90-180 mm, Bio-Rad Laboratories), and eluted with deionized water without any additional buffer, providing clean separation of a yellowish green product band. Following evaporation of the solvent, a glossy film was obtained. The molecular weight of PNES was determined to be ~6.6-25 kD by anion exchange chromatogram, which corresponds to a degree of polymerization (DP) of 18~47.

Sample Batch 1: {[2,5-Diiodo-1,4-bis(3-propoxy-sulfonic acid)napthalene]sodium salt}=66 mg (94.3 mmol; 78.5 mM concentration), 1,2-bis(4',4',5',5'-tetramethyl[1',3',2']dioxaborolan-2'-yl)ethyne=33.4 mg (120 mmol), Pd(OAc)$_2$=6.4 mg (28.6 mmole; 30 mole % relative to monomer), tri(4,6-dimethyl-3-sulfonatophenyl)phosphine trisodium (TXPTS)=66 mg (101 mmole), 1 M NaOH solution=1.2 mL, Reaction temperature=208° C., Reaction time=30 min Isolated yield=38 mg (88% based on 94.3 mmol {[2,5-diiodo-1,4-bis(3-propoxy-sulfonic acid)napthalene]sodium salt}. $^1H$ NMR (500 MHz, $D_2O$): δ 8.2-7.1 (m, 4H), 3.24 (broad m, 8H), 2.45 (broad m, 4H). $^{13}C$ NMR (500 MHz, $D_2O$/DMSO (~10:1 v:v)): δ 140.5 (m), 136.97 (m), 133.9 (m), 127.9 (m) 127.04 (m) 94-92 (m), 69.82 (m), 50.92 (m), 28.04 (m). Anion exchange Chromatography: Mn ~17000. V is ($H_2O$): 408 nm (4.14 calculated per mole of monomer unit); $1_{em}$ ($H_2O$): 461.5 nm. Fluorescence Quantum Yield: 0.031; $1_{em}$ (3:1 MeOH:$H_2O$): 448 nm. Fluorescence Quantum Yield: 0.177.

Sample Batch 2: {[2,5-Diiodo-1,4-bis(3-propoxy-sulfonic acid)napthalene]sodium salt}=66 mg (94.3 mmol; 78.5 mM concentration), 1,2-bis(4',4',5',5'-tetramethyl[1',3',2']dioxaborolan-2'-yl)ethyne=33.4 mg (120 mmol), Pd(OAc)$_2$=3.2 mg (14.3 mmole; 15 mole % relative to monomer), tri(4,6-dimethyl-3-sulfonatophenyl)phosphine trisodium (TXPTS)=33 mg (50.5 mmole), 1 M NaOH solution=1.2 mL, Reaction temperature=208° C., Reaction time=30 min Isolated yield=40 mg (90% based on 94.3 mmol {[2,5-diiodo-1,4-bis(3-propoxy-sulfonic acid)napthalene]sodium salt}.

Sample Batch 3: {[2,5-Diiodo-1,4-bis(3-propoxy-sulfonic acid)napthalene]sodium salt}=33 mg (47.15 mmol; 39.25 mM concentration), 1,2-bis(4',4',5',5'-tetramethyl[1',3',2']dioxaborolan-2'-yl)ethyne=16.7 mg (60 mmol), Pd(OAc)$_2$=1.6 mg (7.15 mmole; 15 mole % relative to monomer), tri(4,6-dimethyl-3-sulfonatophenyl)phosphine trisodium (TXPTS)=16.5 mg (25.25 mmole), 1 M NaOH solution=1.2 mL, Reaction temperature=208° C., Reaction time=30 min Isolated yield=43 mg (94% based on 94.3 mmol {[2,5-diiodo-1,4-bis(3-propoxy-sulfonic acid)napthalene]sodium salt}

Sample Batch 4: {[2,5-Diiodo-1,4-bis(3-propoxy-sulfonic acid)napthalene]sodium salt}=132 mg (188.5 mmol; 157 mM concentration), 1,2-bis(4',4',5',5'-tetramethyl[1',3',2']dioxaborolan-2'-yl)ethyne=66.8 mg (240.3 mmol), Pd(OAc)$_2$=6.4 mg (28.6 mmole; 15 mole % relative to monomer), tri(4,6-dimethyl-3-sulfonatophenyl)phosphine trisodium (TXPTS)=66 mg (101 mmole), 2 M NaOH solution=1.2 mL, Reaction temperature=208° C., Reaction time=30 min Isolated yield=34 mg (77% based on 94.3 mmol {[2,5-diiodo-1,4-bis(3-propoxy-sulfonic acid)napthalene] sodium salt.

Figure 12:
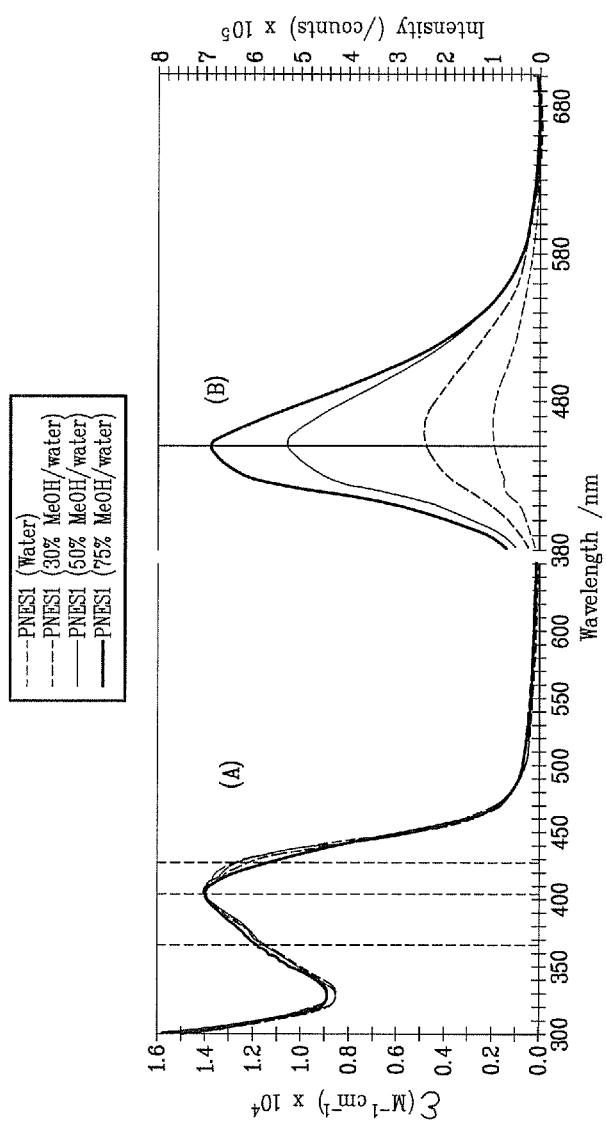
FIG. 12 illustrates (A) absorption spectra of PNES in H₂O and MeOH:H₂O mixed solvent system—the extinction coefficient is shown relative to per mole of monomer unit, (B) corresponding emission spectra—the emission quantum yield increased from 3.1% in neat water to 17.7% in 3:1 MeOH:H₂O with respect to quinine sulfate standard. All spectra were measured at 296±1 K; $\lambda_{ex}$=350 nm

FIG. 12 illustrates (A) absorption spectra of PNES in $H_2O$ and MeOH:$H_2O$ mixed solvent system. The extinction coefficient is shown relative to per mole of monomer unit. (B) Corresponding emission spectra. The emission quantum yield increases from 3.1% in neat water to 17.7% in 3:1 MeOH:$H_2O$ with respect to quinine sulfate standard. All spectra were measured at 296±1 K; $\lambda_{ex}$=350 nm.

What is claimed is:

1. A method for synthesizing an oligomer or a polymer, comprising;
   contacting a bisborylated alkyne and an arene bis([water-solubilizing group]) salt the contacting being performed in an aqueous environment.

2. The method of claim 1, wherein the aqueous environment comprises a mixed solvent system.

3. The method of claim 2, wherein the mixed solvent system comprises water.

4. The method of claim 1, wherein the aqueous environment comprises neat water.

5. The method of claim 1, wherein the contacting is performed under aerobic conditions.

6. The method of claim 1, wherein the contacting is performed under anaerobic conditions.

7. The method of claim 1, wherein the contacting is performed in the presence of a secondary salt.

8. The method of claim 1, wherein the contacting is performed in the presence of a zero-valent metal complex that features a water solubizing ligand.

9. The method of claim 1, wherein a metal salt forms in situ.

10. The method of claim 7, wherein the secondary salt comprises tri(4,6-dimethyl-3-sulfonatophenyl)phosphine trisodium.

11. The method of claim 7, wherein the secondary salt comprises Pd-L, wherein L comprises a water-soluble phosphine ligand.

12. The method of claim 11, wherein L comprises water soluble phosphite, water soluble arsine, a water soluble Lewis base, or any combination thereof.

13. The method of claim 1, wherein the contacting is performed in the presence of a catalyst.

14. The method of claim 13, wherein the catalyst comprises Pd, Pd(OAc)$_2$, Pd(Acac)$_2$, .PdCl$_2$, PdBr$_2$, .PdI$_2$, .Pd (CN)$_2$, .Pd(NO$_3$)$_2$, .Pd($C_5HF_6O_2$)$_2$, .Pd($C_2H_5$ CO$_2$)$_2$, .PdSO$_4$, .Pd(CF$_3$COO)$_2$, PdS, Chloro[(1,2,3-n)-3-phenyl-2-propenyl][1,3-bis(2,6-di-1-propylphenyl)-4,5-dihydroimidazol-2-ylidene]palladium(II), cis-Dichloro(N,N,N',N'-tetramethylethylenediamine)palladium(II), Dichloro [1,1]-bis(di-t-butylphosphino)ferrocene]palladium(II), 1,2-Bis(phenylsulfinyl)ethanepalladium(II) acetate, Acetato(2'-di-t-butylphosphino-1,1]-biphenyl-2-yl)palladium(II), Allylchloro[1,3-bis(2,6-di-1-propylphenyl)-4,5-dihydroimidazol-2-ylidene]palladium(II), Allylchloro[1,3-bis(2,6-di-1-propylphenyl)imidazol-2-ylidene]palladium(II), Allylchloro [1,3-bis(2,4,6-trimethylphenyl)imidazol-2-ylidene] palladium(II), Allylpalladium chloride dimmer, Bis(acetato) triphenylphosphinepalladium(II), Bis[1,2-bis (diphenylphosphino)ethane]palladium (0), Bis (dibenzylideneacetone)palladium (0), 1,3-Bis(2,6-di-1-propylphenyl)imidazol-2-ylidene(1,4-naphthoquinone) palladium (0) dimer, [P,P'-1,3-bis(di-1-propylphosphino) propane][P-1,3-bis(di-1-propylphosphino)propane] palladium (0), Bis(2-methylallyl)palladium chloride dimer, Bis(tri-t-butylphosphine)palladium (0), 1,3-Bis(2,4,6-trimethylphenyl)imidazol-2-ylidene(1,4-naphthoquinone)palladium (0) dimer, Bis(tricyclohexylphosphine)palladium (0), Chloro(di-2-norbornylphosphino)(2'-dimethylamino-1,1'-biphenyl-2-yl)palladium(II), Chloro(di-2-norbornylphosphino)(2-dimethylaminomethylferrocen-1-yl)palladium(II), Crotylpalladium chloride dimer, trans-Di(mu-acetato)bis[o-(di-o-tolylphosphino)benzyl]dipalladium(II), Di(acetato)dicyclohexylphenylphosphinepalladium(II), Diacetatobis (triphenylphosphine)palladium(II), Diamminepalladium(II) nitrite, Di-mu-bromobis(tri-t-butylphosphino)dipalladium (I), Dichlorobis(acetonitrile)palladium(II), Dichlorobis(benzonitrile)palladium(II), Dichloro(1,2-bis(diphenylphosphino)ethane)palladium(II), Dichloro[1,1'-bis (diphenylphosphino)ferrocene]palladium(II), Dichloro(1,3-bis(diphenylphosphino)propane)palladium(II), trans-Dichlorobis(tricyclohexylphosphine)palladium(II), trans-Dichlorobis(triphenylphosphine)palladium(II), trans-Dichlorobis(tri-o-tolylphosphine)palladium(II), Dichloro(1,5-cyclooctadiene)palladium(II), trans-Dichlorodiammine palladium(II), Dichloro(di-mu-chloro)bis[1,3-bis(2,6-di-1-propylphenyl)imidazol-2-ylidene]dipalladium(II), Dichloro (norbornadiene)palladium(II), or any combination thereof.

15. The method of claim 13, wherein the catalyst comprises PdL$_2$, PdCl$_2$L$_2$, PdL$_3$, PdL$_4$, or any combination thereof, wherein L comprises a water-soluble phosphine ligand.

16. The method of claim 1, wherein the contacting is performed under heating.

17. The method of claim 16, wherein the heating comprises microwave heating, infrared heating, convective heating, conductive heating, or any combination thereof.

18. The method of claim 16, wherein the heating occurs to from about 100° C. to about 200° C.

19. The method of claim 16, wherein the heating occurs to about 150° C.

20. The method of claim 1, wherein the contacting is performed in the presence of a base.

* * * * *